(12) United States Patent
van den Nieuwelaar et al.

(10) Patent No.: US 6,912,434 B2
(45) Date of Patent: Jun. 28, 2005

(54) METHOD AND DEVICE FOR PROCESSING SLAUGHTER PRODUCTS

(75) Inventors: Adrianus Josephes van den Nieuwelaar, Gemert (NL); Maurice Eduardus Theodorus van Esbroeck, Bemmel (NL); Wilhelm George von der Heide, Overloon (NL)

(73) Assignee: Stork PMT B.V. (NL)

( * ) Notice: Subject to any disclaimer, the term of this patent is extended or adjusted under 35 U.S.C. 154(b) by 0 days.

(21) Appl. No.: 09/896,548

(22) Filed: Jun. 29, 2001

(65) Prior Publication Data

US 2003/0065414 A1 Apr. 3, 2003

Related U.S. Application Data

(63) Continuation of application No. PCT/NL99/00821, filed on Dec. 30, 1999.

(30) Foreign Application Priority Data

Dec. 31, 1998 (NL) .............................................. 1010930

(51) Int. Cl.[7] .............................................. G06F 19/00
(52) U.S. Cl. ..................... 700/116; 700/115; 452/53
(58) Field of Search ................................ 700/115, 116, 700/226; 426/2; 452/53

(56) References Cited

U.S. PATENT DOCUMENTS

| | | | |
|---|---|---|---|
| 4,627,007 A | | 12/1986 | Muschany |
| 4,941,379 A | * | 7/1990 | Gasbarro .................... 83/409.2 |
| 5,226,118 A | * | 7/1993 | Baker et al. ................ 345/833 |
| 5,246,396 A | | 9/1993 | Schumann et al. |
| 5,401,209 A | * | 3/1995 | Ripol et al. .................... 452/58 |
| 5,478,990 A | * | 12/1995 | Montanari et al. ........... 235/375 |
| 5,668,634 A | * | 9/1997 | Newman ..................... 356/445 |
| 5,964,656 A | * | 10/1999 | Lawler et al. ............... 452/173 |
| 6,104,966 A | * | 8/2000 | Haagensen .................. 700/116 |

FOREIGN PATENT DOCUMENTS

| | | |
|---|---|---|
| EP | 0 024 171 A1 | 2/1981 |
| EP | 0 259 920 A1 | 3/1988 |
| EP | 0 357 843 A1 | 3/1990 |
| EP | 0 489 984 A1 | 6/1992 |
| EP | 0 819 381 A1 | 1/1998 |
| GB | 2 264 217 A | 8/1993 |
| GB | 2 280 093 A | 1/1995 |
| NL | 8900871 | 11/1990 |
| WO | WO 00/40094 | 7/2000 |

* cited by examiner

Primary Examiner—Leo Picard
Assistant Examiner—Elliot L Frank
(74) Attorney, Agent, or Firm—Kristin J. Doyle; Camilla C. Williams; Kilpatrick Stockton LLP

(57) ABSTRACT

A processing of a first slaughter product to form a second slaughter product comprises: providing one or more processing stations, a parameter of a processing to be carried out in the processing stations being adjustable; collecting and storing data indicating the availability of the processing stations; collecting and storing data which indicate the availability of the first and/or second slaughter product; collecting and storing properties of the first and/or second slaughter product; storing relationships between the parameter of the processing and the properties of the first and/or second slaughter product. The processing of the first slaughter product to form the second slaughter product is controlled by adjusting the parameter of the processing on the basis of said data, properties and/or relationships, such that an additional added value is obtained during the processing of the first slaughter product to form the second slaughter product.

33 Claims, 24 Drawing Sheets

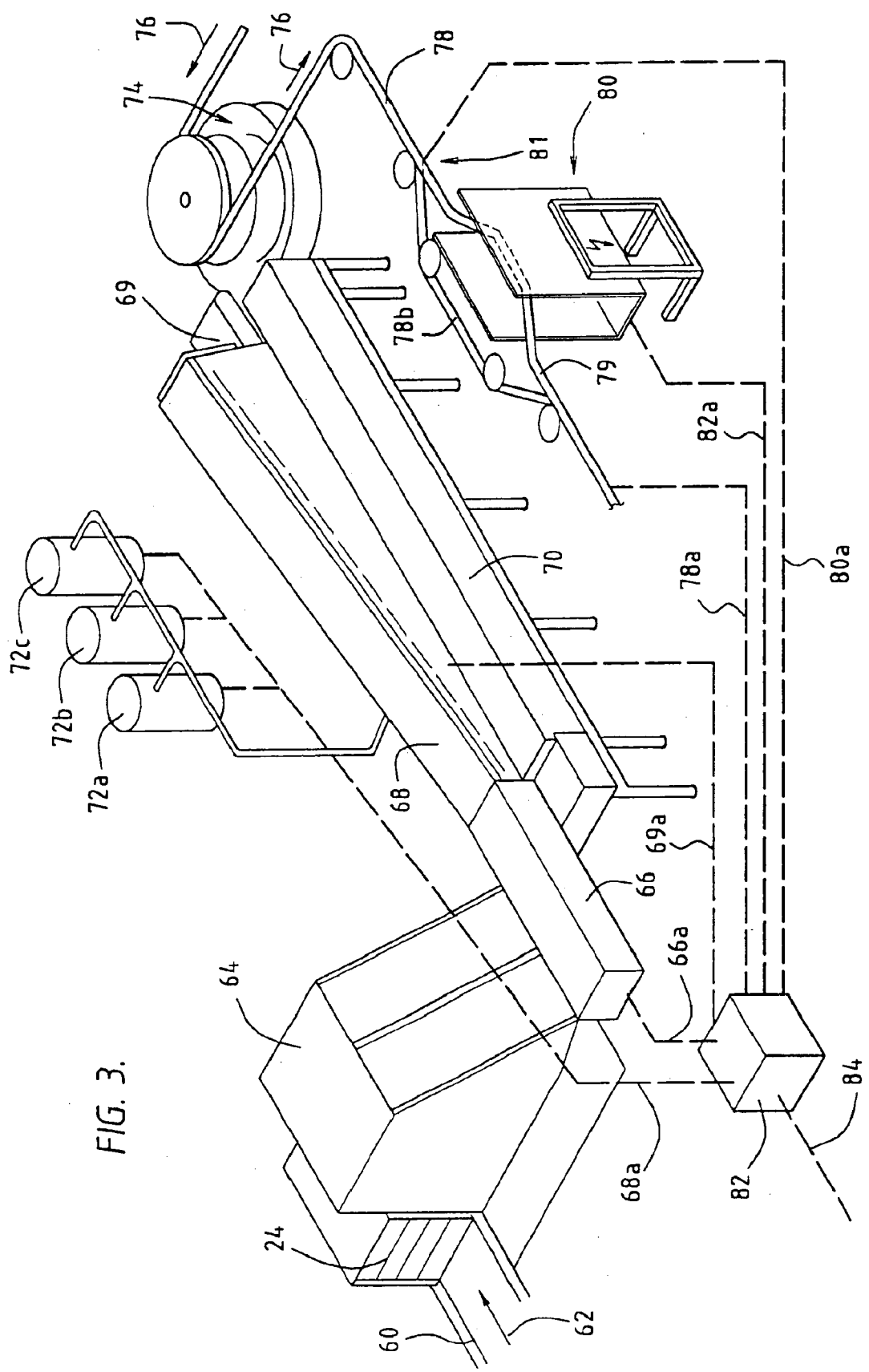

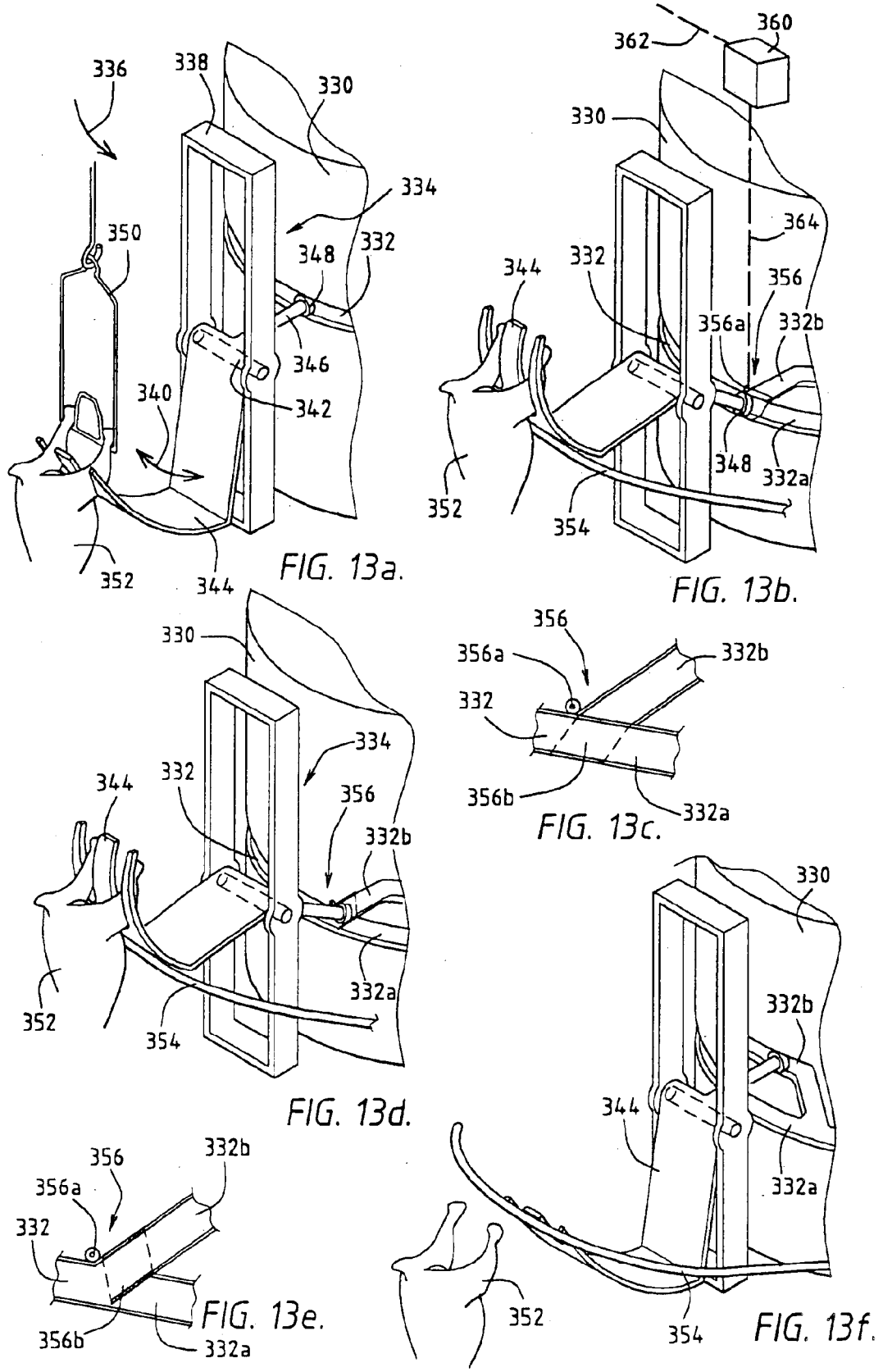

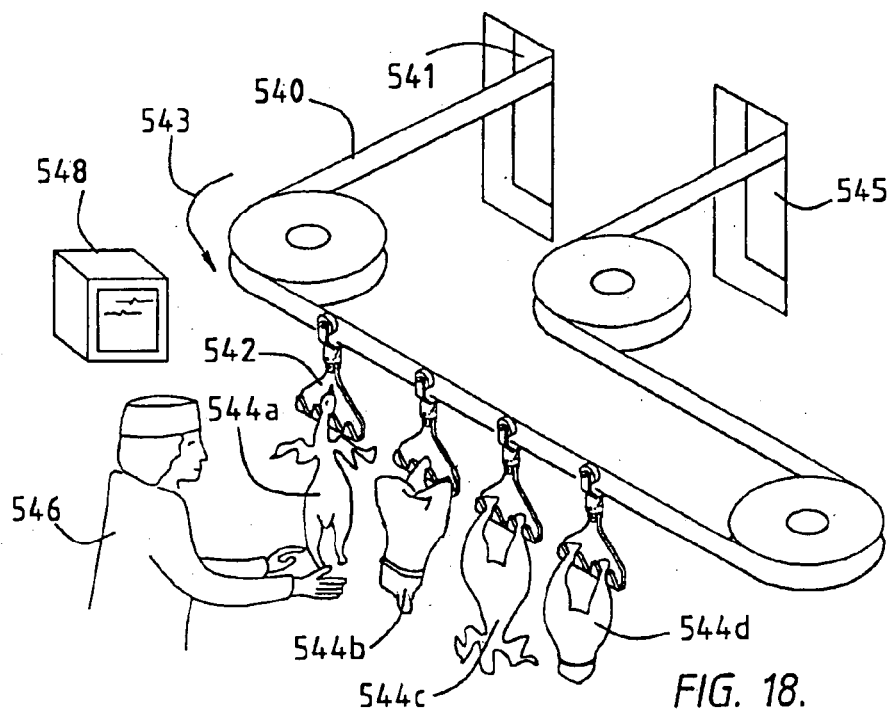
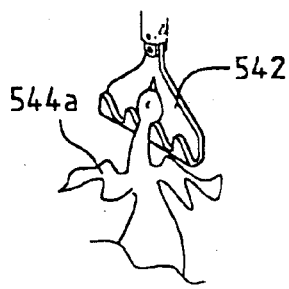 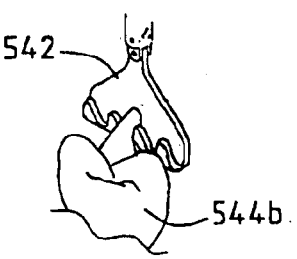 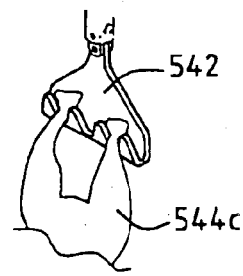
FIG. 18a.   FIG. 18b.   FIG. 18c.
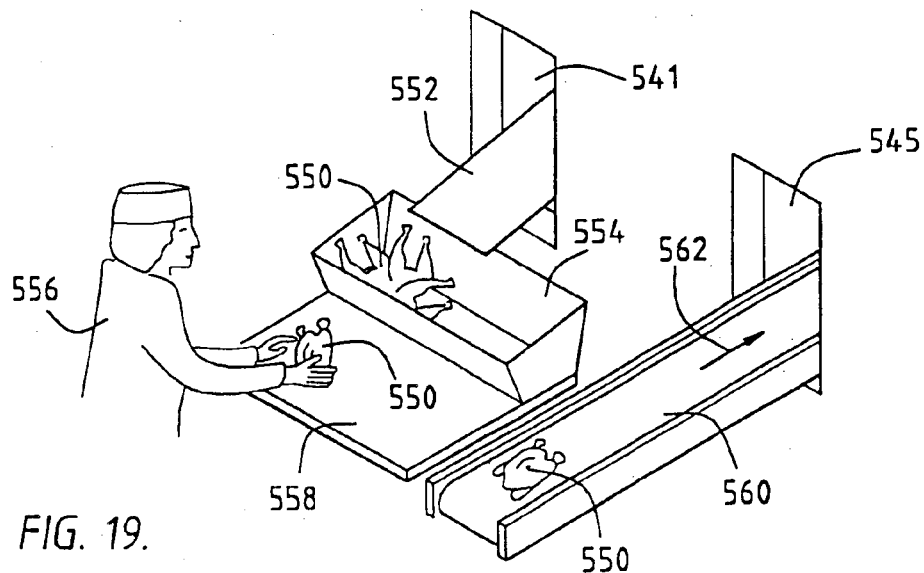
FIG. 19.

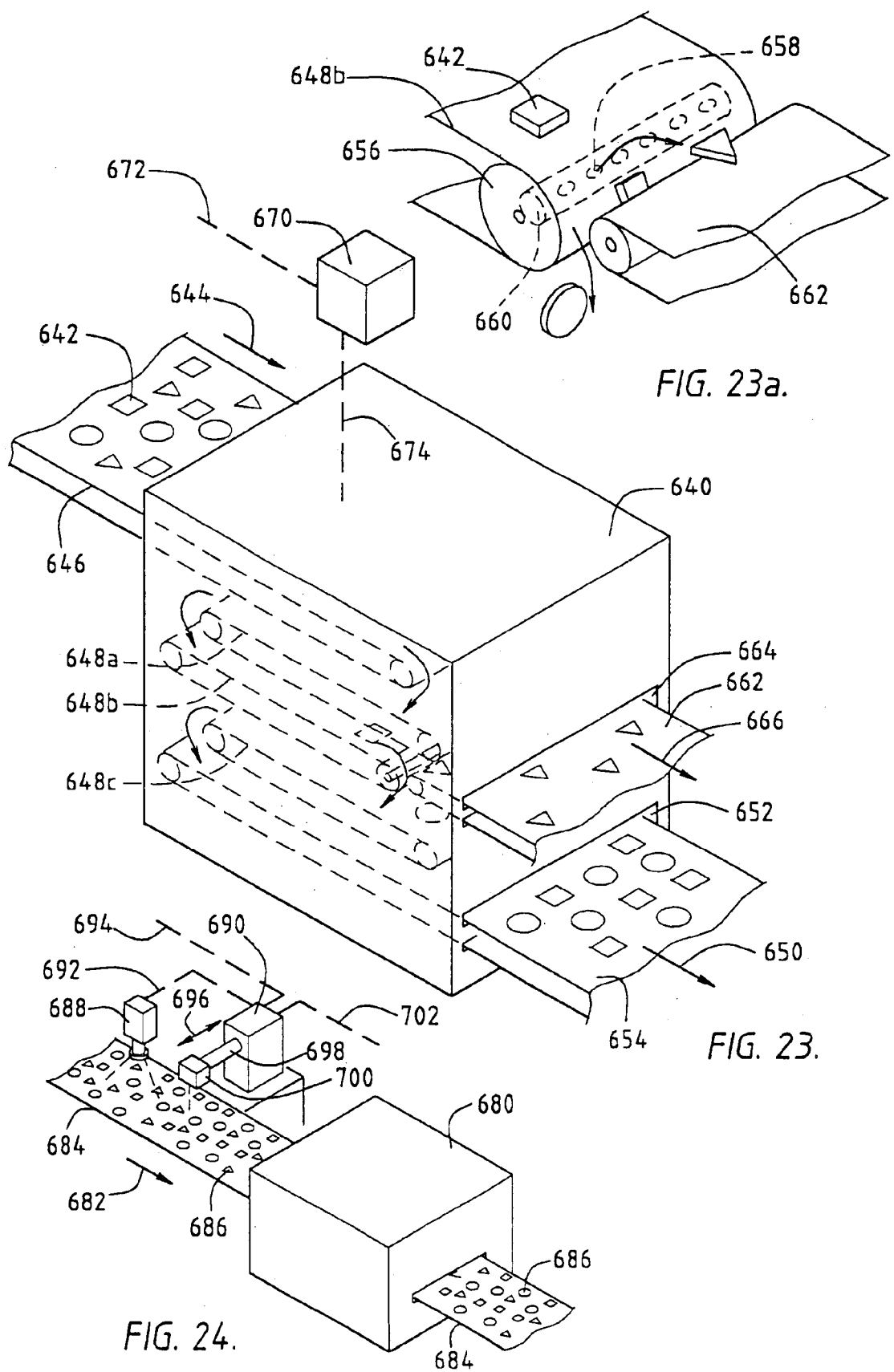

METHOD AND DEVICE FOR PROCESSING SLAUGHTER PRODUCTS

CROSS-REFERENCE TO RELATED APPLICATION

This is a continuation application of PCT/NL99/00821 filed 30 Dec. 1999 which claims priority to Netherlands Application No. 1010930 filed on Dec. 31, 1998.

FIELD OF THE INVENTION

This invention relates to a method and device for processing a first slaughter product to form a second slaughter product, as takes place in a meat-processing factory.

SUMMARY OF THE INVENTION

An object of the invention is to propose measures for carrying out the processing of slaughter animals in a meat-processing factory in such a manner that the supply of slaughter animals is able as far as possible to satisfy the demand for certain quantities and certain qualities for various types of slaughter products, resulting in an optimum deployment of resources and personnel combined with optimum profits. In this context, the term slaughter product is understood to mean a living or dead slaughter animal or part thereof, optionally provided with additives or processed in some other way to form an intermediate or end product.

To achieve this object, the method according to the invention comprises: providing one or more processing stations, at least one parameter of a processing to be carried out in the one or more processing stations being adjustable; recording data relating to one or more properties of the first and/or second slaughter product; recording data relating to one or more relationships between data relating to the at least one parameter of the processing and the one or more properties of the first and/or second slaughter product; and controlling the processing of the first slaughter product to form the second slaughter product by adjusting the at least one parameter of the processing on the basis of at least some of said data, in such a manner that an additional added value, in particular a maximum added value, is obtained during processing of the first slaughter product to form the second slaughter product. The term recording of data is understood to mean the inputting, collection and/or storing of data. Without recording said data, it would be impossible to obtain any additional added value, i.e. an added value which exceeds an added value which can conventionally be achieved. The additional added value can be maximized within the possibilities determined by the recorded data. Said method is carried out, with the aid of suitable means, in a device according to the invention.

In the method and device according to the invention, a processing station is understood to mean a working environment in which one or more processings take place manually or mechanically. Alternatively, a processing may comprise a plurality of processing stations. A processing may comprise an entire, completed process, but may also relate to part of this entire, completed process.

Parameters of a processing are, for example, a duration of a processing, a processing tool setting of a machine which forms part of a processing, a temperature, a force, a frequency, a pressure, an electric voltage, an electric current or power. Also, the question of whether or not a processing is carried out or a processing station is passed through is considered to be a parameter of a processing. A non-limiting list of processings and adjustable parameters thereof is given below for poultry.

| Processing | Parameters |
|---|---|
| Stunning | level of electric voltage (electrical stunning); composition of gas mixture (gas stunning) |
| Killing | type of cut or incision for opening blood vessel; location of cut or incision |
| Scalding | temperature; residence time; location in process; extent of agitation of scalding liquid |
| Plucking | aggressiveness (position of plucking fingers with respect to slaughter product; rotational speed of plucking fingers); position in process; position on slaughter product |
| Cutting legs | length of leg stump |
| Opening carcass | length of abdominal incision; type of incision |
| Removing crop | use of vacuum; depth of vacuum |
| Cutting off necks | length of neck stump |
| Cutting neck skin | length of neck skin |
| Cooling | type of cooling medium (water; air; nitrogen; carbon dioxide); temperature of cooling medium; quantity of cooling medium; residence time; temperature of slaughter product |
| Dividing | location of separation; quantity of meat on slaughter product |
| Obtaining residual meat | composition (bone marrow; fat; rheological properties); temperature; yield |

In preferred embodiments of the method according to the invention, data are recorded which indicate the availability of at least one of the processing stations, of one of the slaughter products and/or of staff. For this purpose, the device according to the invention provides suitable means, namely processing station availability recording means, slaughter product availability recording means and staff recording means.

The availability of a processing station is intended to mean the ability of a processing station to carry out a specific (part of a) processing on a first slaughter product at a specific time, which may lie in the past, the present or the future. At the moment at which the availability is established, the first slaughter product does not yet have to actually exist, if the said time is in the future. A processing station may or may not be available at the moment at which the availability is established or at a later time (such as may be switched on or switched off), or may, for example, be free from faults or may be subject to faults (for example jammed or blocked), and there may or may not be sufficient or insufficient qualified (operating) staff, or the maximum capacity may have been reached, or a buffer situated in the processing station may be full. It is also possible to take into account maintenance work which is planned for the future, during which the processing station cannot function. On the other hand, the processing station may, for example, be also available or unavailable because the product is suitable or unsuitable for the processing station, due to the size of the product, its weight, any contamination or infection, a specific prior processing of the product, a specific composition of the product, or a specific priority of the processing to be carried out in the processing station.

The availability of first and/or second slaughter products is intended to mean the presence of first and/or second slaughter products at a specific processing station at a specific time, which may be in the past, the present or the future. The availability of first and/or second slaughter products may, for example, be determined by a priority scheme of orders in the meat-processing factory, a specific pipeline, a time of processing, a preprocessing carried out, with the result that the slaughter product may or may not be makeable, a desired number, a desired weight or a specific property.

In one or more processing stations, one or more processings can be carried out either manually or mechanically. In the former case, staff are required in order to carry out manual processings. In the latter case too, staff may be required in order to commence and maintain operation of a processing device. In cases in which staff are required for processing a first slaughter process to form a second slaughter product, the availability of staff is intended to mean the presence of sufficient, qualified operators for carrying out specific tasks, such as the operation of a (part of a) processing station, carrying out a (part of a) processing, maintaining machines, supervising, and directing other staff, etc. In the method according to the invention, information is collected on an ongoing basis and the processing of a first slaughter product to form a second slaughter product is carried out in a flexible manner on the basis of information about the results of (a) prior processing(es) for one or more slaughter products or for the present first or second slaughter product, information concerning the results of the current processing (es) for one or more other slaughter products or for the present first or second slaughter product, and information concerning the results of (a) subsequent processing(es) for one or more other slaughter products. Consequently, it is possible for processings to be optimally controlled and adapted to current requirements, and to make a prediction about the feasibility of desired results of processing of first slaughter products to form second slaughter products at the earliest possible stage of one or more processings.

The properties of the first and the second slaughter products are understood to mean the current properties, i.e. the properties of the first and second slaughter products which are being treated, and/or the historical properties, i.e. the properties of first and second slaughter products which have been processed at an earlier time, and/or the future properties, i.e. the properties of first and second slaughter products which will be processed at a later time.

The following properties of first and second slaughter products of poultry may be mentioned: the weight, the dimensions, the composition (chemical; proportion of skin; proportion of fat; proportion of bone), the visual quality, the origin (country; breed; feed; rearing method; fattening farm), the microbial quality (type and number of pathogens), tenderness, moisture loss (during draining or cooking processes), the texture, presence of residual blood, the extent of exsanguination, the extent of scalding, the length of the leg stump, the way in which the crop was removed, the length of the neck stump, the length of the neck skin, the presence of the head, the extent of removal of viscera (gutted; ready-to-cook), the type and length of the opening incision, the ATP concentration, the glycogen concentration, the elasticity, the hardness, the resilience, the mastication properties, the fragility, the gumminess, the adhesiveness, the stickiness, the hanging time, the stomach emptying time, the relaxation time.

According to the invention, deliberate variations of second slaughter products derived from the first slaughter products can be created from an invariability in properties of first slaughter products, such as dimensions, weight, tenderness, colour, etc., in one or more processings. On the other hand, it is also possible to obtain uniformity of second slaughter products derived from the first slaughter products from variability of first slaughter products in one or more processings. The desired invariability or variability can be obtained by using a processing to upgrade or downgrade a slaughter product, such as making meat more tender or less tender, depending on the desired intermediate product, by-product or end product.

A relationship between a parameter of a first processing and a property of a first or second slaughter product is understood to mean a correlation between at least two parameter values and at least two associated properties, with the result that it is possible to select an optimum parameter for the most desirable property. The term added value can be measured in money terms, such as production costs or sale value per slaughter product or collection of slaughter products at a specific moment in time, but may also relate, for example, to the use of a machine, to the promptness of supply of slaughter products, to the satisfaction of one or more specific customers with regard to the number of slaughter products and/or the weight of the slaughter products and/or the quality of the slaughter products, to the yield in terms of weight, to the avoidance of risks (for example associated with pathogens), to achieving a specific combination of quality or processing properties of the slaughter products, to the utilization of the production capacity, to making relatively expensive slaughter products heavier than inexpensive slaughter products, to increasing the yield by processing heavier animals, etc.

Examples of relationships between parameters of processings and properties of slaughter products from poultry, viewed with regard to the added value, which may be mentioned are:

a longer stomach emptying time than that which is required for emptying the intestinal tract costs approx. 0.2% meat per hour, with the associated loss of income against current meat prices;

storing a prepared slaughter product for one night costs approx. 0.05% slaughter product, with the associated loss of income against the current slaughter product price. In addition, this costs space, depreciation, cooling energy, etc.;

the selection of a specific slaughter product for a filleting processing leads to a higher yield, and therefore a higher profit in the case of heavier slaughter products;

the working costs for obtaining a specific quantity of fillet are considerably lower for heavy slaughter products than for light slaughter products;

separating waste with a low health risk from waste with a high health risk leads to a (low) profit for the waste with a low health risk (for use in animal fodder) as against (high) costs for waste with a high safety risk;

the length of a stump affects the weight of the slaughter product in question, a longer stump providing a higher income and also leading to less trimming work for staff to carry out when removing legs, since tendons are removed better, thus saving on staff;

the abdominal fat as waste material produces little income. The income is higher for human consumption, while a high yield is produced if it remains joined to a carcass and thus contributes to the weight of the carcass for the carcass price;

the length of the neck stump can be kept short, with the result that the separated neck is longer and provides more income. On the other hand, the neck stump can be kept long, contributing to the weight of the slaughter product to which it is joined. On the other hand, an excessive length is disadvantageous, since it may lead to damage to the packaging of the slaughter product;

broken legs considerably disrupt a substantially mechanized leg removal process and require trimming work to be carried out by the staff. The value of the legs falls due to the actions having to be carried out by hand. However, the broken legs may also be separated from the unbroken legs upstream of a mechanical processing and can be processed by hand, resulting in the same high value as a mechanical processing. The broken legs may be added in a defined number or percentage to unbroken legs, according to the customer's specifications. It is thus possible to supply a defined quality;

when cutting joints (for example at the knee joint, the shoulder joint or a wing joint), a specific setting of the corresponding cutting device provides the possibility of selecting whether to leave tendons on the joint. In this way, meat is able or unable to pull back from the joint during further processing, which has consequences for the quality of meat and the presentation of the slaughter products. Also, more weight on a relatively expensive slaughter product can provide a higher profit;

slaughter products or groups of slaughter products which are contaminated with pathogens can be processed using a scalding process at high temperature or can have their skin removed. Slaughter products of this nature can be processed at the end of production in order to prevent contamination to healthy products.

Preferably, the method according to the invention consists in controlling the processing of the first slaughter product to form the second slaughter product by selecting a routing for processing the first slaughter product to form the second slaughter product on the basis of at least some of said data. A routing is understood to mean: the execution of a specific processing or a series of specific processings. The device according to the invention comprises suitable means for carrying out the routing selection.

The selection of the routing involves the first slaughter product being guided past one or more selected processing stations in order for one or more selected processings to be carried out using selected parameters in order to obtain the second slaughter product. This routing is selected in such a manner than an additional or maximum added value is obtained.

In a preferred embodiment of the device according to the invention, the slaughter product property recording means comprise a data input means which operates automatically or is actuated by an operator, for inputting data relating to at least part of the first or second slaughter product, and a data-processing system which is connected to the data input means. It is thus possible to input data, such as health data, relating to a group of slaughter animals, for example via a communications port or a keyboard of the data-processing system.

In another preferred embodiment of the device according to the invention, the slaughter product property recording means comprise first weighing means for recording the weight of a number of slaughter products prior to a processing; second weighing means for recording the weight of a proportion of the number of slaughter products after the processing; and a data-processing system for recording weight data which have been determined by the first and second weighing means.

In another preferred embodiment of the device according to the invention, the processing station is a stunning station for a living slaughter animal, comprising a stunning device for stunning the slaughter animal, the processing parameter adjustment means being adapted to adjust a parameter of a stunning process carried out in the stunning device, and a data-processing system for controlling the processing parameter adjustment means.

In another preferred embodiment of the device according to the invention, the processing station is an exsanguination station, comprising at least one blood vessel opening device with a working area for opening at least one blood vessel of a slaughter animal, the processing parameter adjustment means being adapted to move the slaughter animal into or out of the working area of the blood vessel opening device, and a data-processing system for controlling the processing parameter adjustment means. In this case, the working area of the blood vessel opening device may optionally be displaced towards the slaughter animal for the purpose of opening or not opening the at least one blood vessel, but the slaughter animal may also be moved into or out of the working area of the blood vessel opening device in order for the at least one blood vessel to be opened or not to be opened.

To avoid convulsions during exsanguination, it is preferable to use post-stunning, for which purpose the stunning station is arranged downstream of the exsanguination station.

In another preferred embodiment of the device according to the invention, the processing station is a scalding station, comprising a scalding device with at least two reservoirs which are intended to contain scalding liquids at different temperatures, the processing parameter adjustment means being adapted to move at least a part of a slaughter animal or a group of slaughter animals into the first reservoir and/or the second reservoir, and a data-processing system for controlling the processing parameter adjustment means.

In another preferred embodiment of the device according to the invention, the processing station is a scalding station, comprising a scalding device with at least one reservoir which is adapted to contain a scalding liquid, the processing parameter adjustment means being adapted to adjust the scalding time and/or the temperature of the scalding liquid, and a data-processing system for controlling the processing parameter adjustment means. It is possible, for example on the basis of a demand for specific final slaughter products, to carry out a scalding process at a specified temperature and/or for a specified time on individual slaughter products. It is also possible to adjust the time and/or temperature of the scalding process on the basis of the weight of the slaughter products.

In another preferred embodiment of the device according to the invention, the processing station is a scalding station, comprising a scalding device with at least one reservoir which is adapted to contain a scalding liquid, the processing parameter adjustment means being adapted to move at least the head of a slaughter animal into or out of the working area of the scalding device, and a data-processing system for controlling the processing parameter adjustment means.

In another preferred embodiment of the device according to the invention, the processing station is a massage station, comprising at least one massage device which is adapted to act mechanically on one or more slaughter products in a working area of the massage device, the processing parameter adjustment means being adapted to move the one or more slaughter products into or out of the working area of the at least one massage device; and a data-processing system for controlling the processing parameter adjustment means.

In a further preferred embodiment of the device according to the invention, the processing station is a buffer station, comprising conveyor means for conveying slaughter products through the buffer station; a buffer device which is adapted to buffer the slaughter products, the processing parameter adjustment means being adapted to selectively remove the slaughter products from the conveyor means and buffer them in the buffer device, and then to selectively supply the slaughter products from the buffer device to the conveyor means; and a data-processing system for controlling the processing parameter adjustment means.

In a further preferred embodiment of the device according to the invention, the processing station is a head-pulling station, comprising a head-pulling device which is adapted to pull off the heads of one or more slaughter animals in a working area of the head-pulling device, the processing parameter adjustment means being adapted to move the one or more slaughter animals into or out of the working area of the head-pulling device; and a data-processing system for controlling the processing parameter adjustment means.

In a further preferred embodiment of the device according to the invention, the processing station is a cutting station, comprising at least one cutting unit which is adapted to make a cut in one or more slaughter products in a working area of the cutting unit, the processing parameter adjustment means being adapted to displace the at least one cutting unit in order to move the one or more slaughter products into or out of the working area of the at least one cutting unit, and a data-processing system for controlling the processing parameter adjustment means.

In a further embodiment of the device according to the invention, the processing station comprises a processing tool with a movement which is determined by a follower roller, which is connected to the processing tool and can be displaced in a control groove in a wall, in which device drive means are provided for displacing the wall and the follower roller with respect to one another, in which device the groove, at the location of a bifurcation, continues in at least two adjoining subsequent grooves, and at the location of the bifurcation the groove comprises an adjustable switch mechanism with at least two positions, for guiding the follower roller into one of the subsequent grooves, in which device the processing parameter adjustment means are adapted to place the switch mechanism in a specific position, and in which device a data-processing system for controlling the processing parameter adjustment means is provided.

In a further preferred embodiment of the device according to the invention, the processing station is a waste-removal station, comprising at least one waste-removal device for removing a waste slaughter product in a working area of the waste-removal station, the processing parameter adjustment means being adapted to move a waste slaughter product into or out of the working area of the waste-removal device, and a data-processing system for controlling the processing parameter adjustment means.

In a further preferred embodiment of the device according to the invention, it comprises a number of processing stations which each have a working area, the processing parameter adjustment means being adapted to move one or more slaughter products into or out of the respective working areas of the processing stations on the basis of data recorded upstream with respect to the processing means, and a data-processing system for controlling the processing parameter adjustment means. In a device of this nature, data relating to the slaughter products are collected only prior to the processings which are to be carried out in the processing stations, and not while the processings are being carried out, for example because the slaughter product has to undergo a number of established processings.

In a further preferred embodiment of the device according to the invention, the processing station is a correction station, comprising a correction device which is adapted to correct a processing which has previously been carried out on a slaughter product; and a data-processing system for controlling the processing parameter adjustment means.

In a further preferred embodiment of the device according to the invention, the processing station is a cooling station, comprising a number of cooling devices which are adapted to cool a slaughter product in various ways; a transfer device for transferring the slaughter product to one or more of the cooling devices, the processing parameter adjustment means being adapted to transfer the slaughter product into the transfer device on the basis of a determined weight or a determined quality of the slaughter product, and a data-processing system for controlling the processing parameter adjustment means.

In a further preferred embodiment of the device according to the invention, the slaughter product property recording means are adapted to connect a slaughter product to a slaughter product carrier in a predetermined manner. For example, if the slaughter product carrier is a hook for hanging a carcass, the carcass can be hung from the hook by its head, by its tail, or by one or two of its legs, if the hook is of suitable design. Each of the various ways of hanging the carcass may be characteristic of a specific property of (a part of) the slaughter product.

In a further preferred embodiment of the device according to the invention, the processing station comprises a processing device which is adapted to carry out a processing on one or more slaughter products in a working area of the processing device, the processing parameter adjustment means being adapted to displace at least part of the processing device in such a manner that the slaughter product is located inside or outside the working area of the processing device, and a data-processing system for controlling the processing parameter adjustment means.

In a further preferred embodiment of the device according to the invention, the slaughter product property recording means are adapted to position a slaughter product in a predetermined manner. The position, which is understood to mean a specific orientation, of a slaughter product can thus be used to record the type of processing(es) to be carried out on the slaughter product. The position, for example the angular inclination of a slaughter product on or from a slaughter product carrier, can be determined automatically or can be determined by operating staff.

In a further preferred embodiment of the device according to the invention, the processing station is a heat-treatment station, comprising an oven with a first outlet and a second outlet, the processing parameter adjustment means being adapted to discharge slaughter products from the oven via the first outlet or via the second outlet, and a data-processing system for controlling the processing parameter adjustment means.

The claims and advantages will be more readily appreciated as the same becomes better understood by reference to the following detailed description and considered in connection with the accompanying drawings in which like reference symbols designate like parts.

BRIEF DESCRIPTION OF THE DRAWINGS

FIG. 3 shows a diagrammatic, perspective view, partially in the form of a block diagram, of an arrangement for stunning poultry in a meat-processing factory.

FIGS. 4b and 4c show diagrammatic, perspective views of the result of processings carried out on birds in devices shown in FIG. 4a.

FIGS. 13a–13f show diagrammatic, perspective views, partially in the form of a block diagram, of a transfer and release device, FIGS. 13c and 13e showing details.

FIG. 18 shows a diagrammatic, perspective view of a processing station for tying up poultry.

FIGS. 18a–18c show perspective views of details from FIG. 18.

FIG. 19 shows a diagrammatic, perspective view of an alternative processing station for tying up poultry.

FIGS. 23–26 show diagrammatic, perspective views, partially in the form of a block diagram, of various ovens.

DESCRIPTION OF THE PREFERRED EMBODIMENTS

In various Figures, the way in which stationary components of a device are secured in a frame or the like is not shown, for the sake of clarity.

Figure 1A:
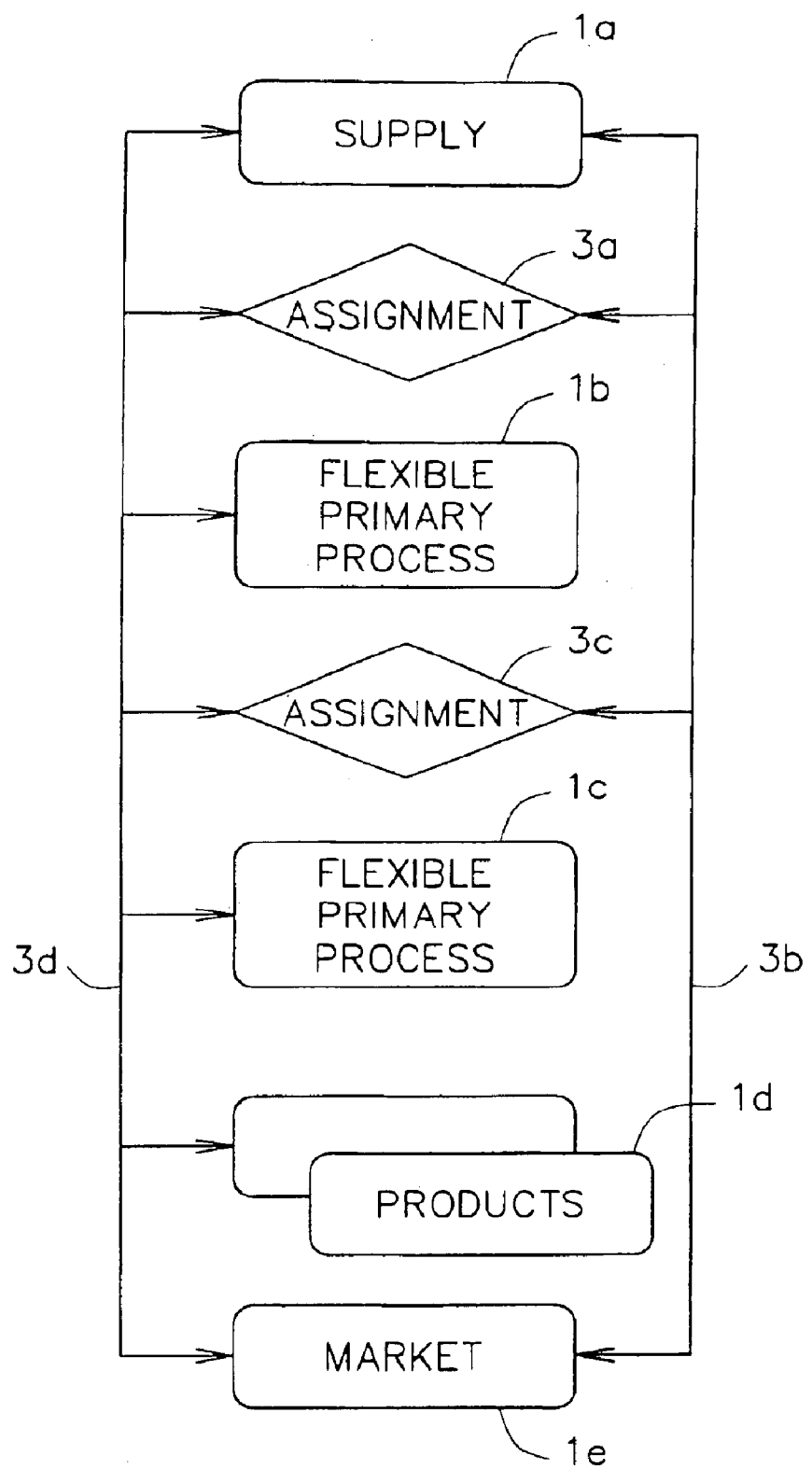
FIG. 1a shows a block diagram illustrating the underlying principles of the invention.

FIG. 1a shows processings in a meat-processing factory, in the form of a block diagram. Block 1a symbolizes the supply of slaughter animals from a fattening farm. Block 1b symbolizes flexible primary processings, such as slaughtering, removal of skin or feathers, exsanguination and removal of viscera. Block 1c symbolizes flexible secondary processings, such as boning, dividing, comminuting, marinating, crumb-coating, boiling, baking, frying and the like. Block 1d symbolizes the slaughter products obtained using the processings. Block 1e symbolizes the removal of the slaughter products to the market.

The slaughter animals supplied, on their basis of their properties, as are known from the fattening farm (supply side), on the basis of information from the primary and secondary processings, and/or on the basis of information from the market (demand side), are allocated to the primary processings, as symbolized by diamond 3a and branched information flow arrow 3b. The slaughter products obtained using the primary processings, on the basis of their properties, as known from the primary processings, on the basis of information from the secondary processings, and/or on the basis of information from the market, are allocated to the secondary processings, as symbolized by diamond 3c and information flow arrow 3b. In principle, it is possible to exchange data between all the steps 1a, 3a, 1b, 3c, 1c, 1d and 1e in the processing, as symbolized by branched data flow arrow 3d.

Figure 1B:
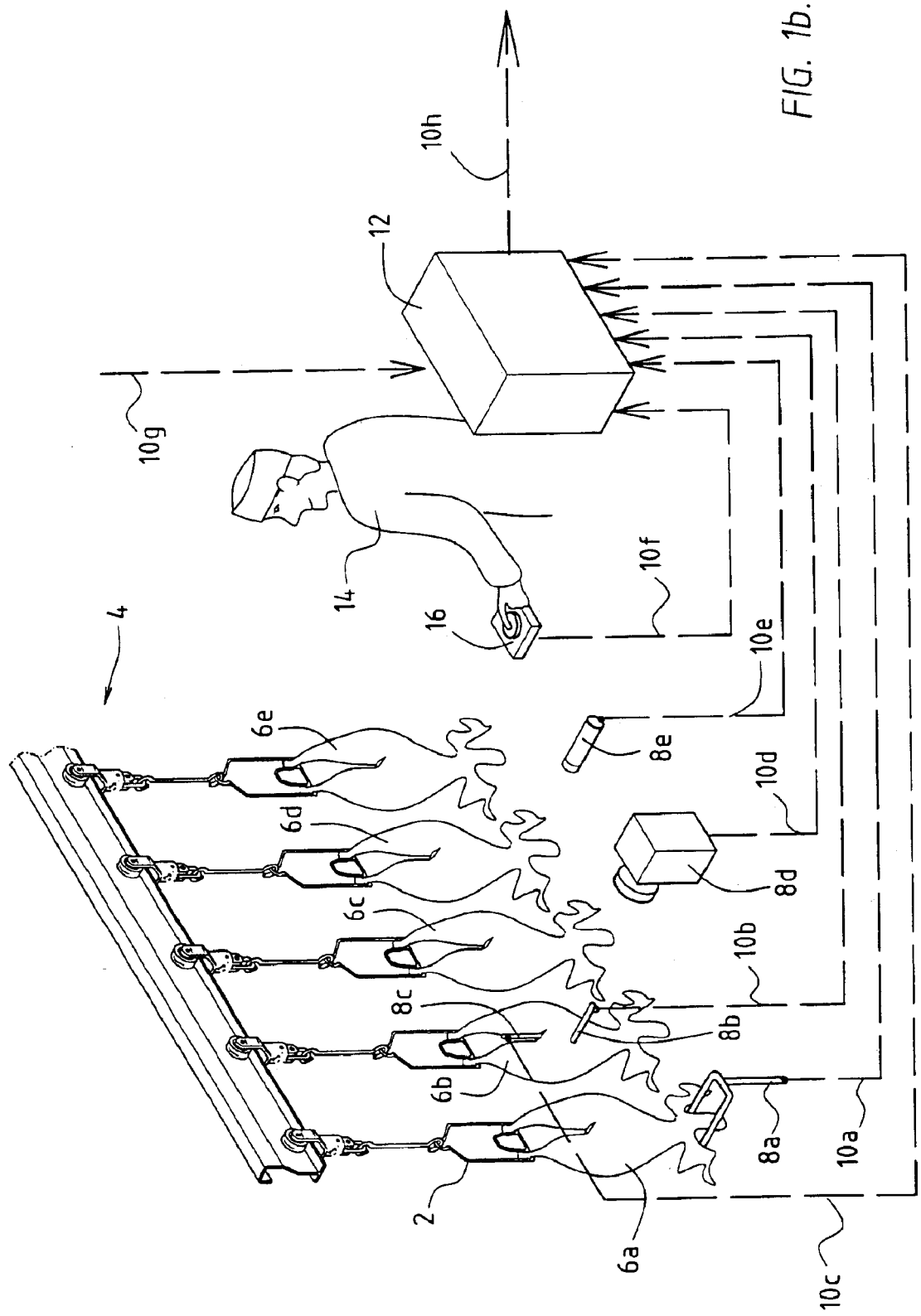
FIG. 1b shows a diagrammatic, perspective view, partially in the form of a block diagram, relating to various ways of gathering information about slaughter products.

Without being exhaustive, FIG. 1b illustrate various ways of collecting data about slaughter products, which in the present case are carcasses 6a, 6b, 6c, 6d and 6e which are suspended by their legs from conveyor hooks 2 of a conveyor 4. Carcass 6a is weighed with the aid of a measuring device 8a which is not shown in more detail and is known per se, a measurement signal, which represents the weight of the carcass 6a, being fed to and stored in a data-processing system 12 which is provided with a memory, as symbolized by the dashed line 10a. In another embodiment, the device 8a may represent a device for measuring the stiffness of the carcass 6a or a sensor for blood analysis. With the aid of pH sensors 8b and 8c, which are not shown in more detail and are known per se, the pH of carcass 6b is measured on the outside of the carcass 6b and in its abdominal cavity, respectively, and corresponding signals are fed to and stored in the data-processing system 12, as symbolized by the dashed lines 10b and 10c. A camera 8d takes a stationary or moving picture (in visible light or, for example, under X-radiation) of the carcass 6e, in order to assess the carcass 6c, corresponding signals being fed to and stored in the data-processing system 12, as symbolized by the dashed line 10d. It is also possible for 8d to represent a sensor for carrying out an MRI scan or a colour measurement. A temperature sensor 8e measures the temperature of (a part of) the carcass 6d, a corresponding signal being fed to and stored in the data-processing system 12, as symbolized by the dashed line 10e. Carcass 6e is visually assessed by an inspector 14, the inspector 14 being able to use a push-button or rotary knob 16 or other data input means, such as a keyboard, to generate a signal which is fed to and stored in the data-processing system 12, as symbolized by the dashed line 10f. In a practical situation, the measurements and assessments described will not generally follow one another, as suggested by FIG. 1b, but will be used only where needed. The data-processing system 12 may be fed with one or more further signals, as symbolized by dashed line 10g. These one or more further signals may relate to measurements which are carried out upstream or downstream in the processing (such as health data (for example: salmonella infection) from a fattening farm which, when a group of slaughter animals arrive in a meat-processing factory, are fed to the data-processing system 12 for each group; a measurement of the composition or properties of manure from a slaughter animal; a measurement of the ambient temperature, for example in a fattening farm; a measurement of the composition of air exhaled by a slaughter animal; a measurement of the behaviour of a living slaughter animal), or may, for example, be a measure of a desired number of slaughter products of a specific type. After one or more of the input signals have been processed, the data-processing system 12 may supply one or more output signals, as symbolized by dashed line 10h, in order to select a specific routing, destination, line or outlet for the slaughter product or a group of slaughter products. During this processing, it is possible to make use of historic data or data gained from experience relating to one or more relationships between parameters of a processing and properties of a slaughter product which have previously been stored in the data-processing system 12. The one or more output signals can be used to control the processing of the slaughter products. It should also be noted that the processing of the first and second slaughter products can also be controlled by incorporating unoccupied slaughter product carriers between slaughter product carriers which are occupied with slaughter products, in order in this way to mark and separate from one another groups of slaughter products with different properties.

Figure 2:
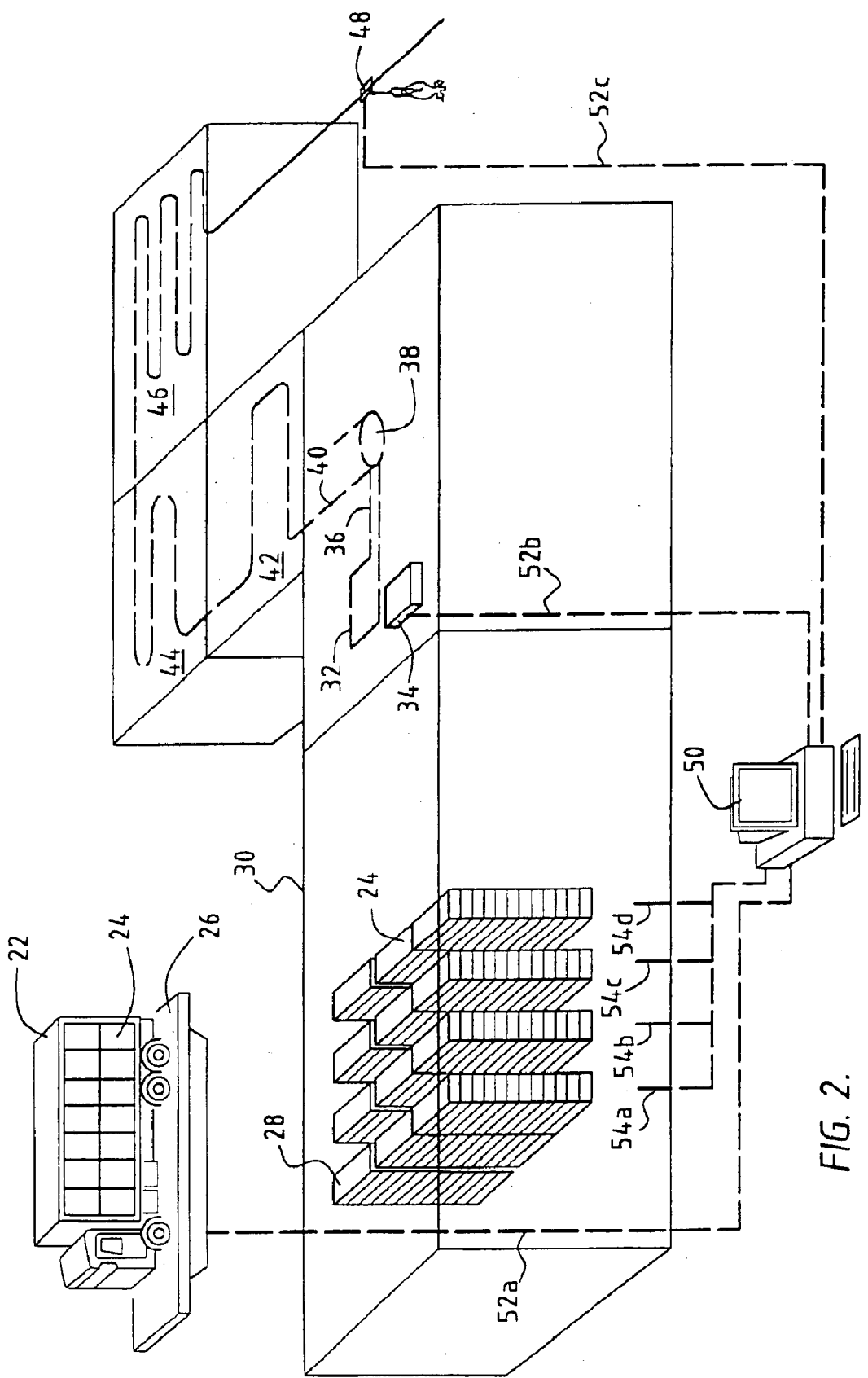
FIG. 2 shows a diagrammatic, perspective view, partially in the form of a block diagram, of a processing inside and outside a meat-processing factory.

FIG. 2 shows a lorry 22 for transporting small animals, such as poultry or small mammals, in containers 24. The lorry 22 is on a weighbridge 26, with the aid of which the total mass of the animals is determined. This weighing generally takes place before, during or after the transport which the lorry 22 is to be used for, and more particularly at a fattening farm or at a meat-processing factory. After transport, the containers 24 are unloaded from the lorry 22 and placed in stacks 28 in a waiting area 30 of a meat-processing factory for a certain time, which is known as the stomach emptyingtime. After the stomach emptyingtime, the containers 24 are emptied into a conveyor system 32, in which the animals are weighed again, in this case per container 24, with the aid of a weighing device 34 (not shown in more detail). By way of non-limiting example, the conveyor system 32 leads the animals through a gas stunning device 36 to an endless carousel conveyor 38, from where the stunned or killed animals are hung from a conveyor 40. The conveyor 40 takes the animals through various departments of a meat-processing factory, namely a slaughter department 42 for carrying out a slaughter process, a ready-to-cook department 44 for removing viscera from the animals, a cooling department 46 for cooling carcasses, and any other departments for carrying out other processings not shown in FIG. 2. After they have passed through the cooling process in the cooling department 46, the carcasses are weighed individually with the aid of a weighing device 48.

The measurement signals from the weighbridge 26, the weighing device 34 and the weighing device 48 are fed to and stored in a data-processing system 50, as symbolized by the dashed lines 52a, 52b and 52c, respectively. Furthermore, the data-processing system 50 is fed data providing information on the time which each container 24 spends in the waiting area 30, as symbolized by the dashed lines 54a, 54b, 54c and 54d. For a specific container 24, time measurement of this nature may, for example, be brought about by providing it with a unique readable label, the label being read at a first time when the container 24 enters the weighting area 30, the label is read again at a second time when the container 24 is emptied onto the conveyor 32, and the first and second times relating to the container 24 are stored in the data-processing system 50. The time which is required for transport in the lorry 22 may also be recorded in the data-processing system 50, as may parameters relating to the conditions, such as the ambient temperature, under which transport and stomach emptying took place.

During transport from the fattening farm to the meat-processing factory, and during the stomach emptying time, the slaughter animals lose weight since, in the first instance, they lose faecal matter, and in the second instance they lose bodyweight through loss of moisture and consumption of energy. During the slaughtering, ready-to-cook and/or cooling process, the weight of the slaughter products changes further due to substances being released and taken up. The associated changes in weight in relation to the stomach emptying time can be determined with the aid of weighing devices 26, 34 and 48 and stored by the data-processing system 50. On the basis of historical information stored in this way, it is possible, on the one hand, to make a prediction concerning the weight of a slaughter product in a specific phase of a processing; on the other hand, it is possible to select a specific stomach emptying time on the basis of a desired weight of a slaughter product which is to be obtained in a specific phase of a processing.

In addition to a relationship between the stomach emptying time and the weight of slaughter products, there are also relationships between:

the stomach emptying time and the pH of pieces of meat. A relatively long stomach emptying time results in a relatively high final pH;

the stomach emptying time and the time between death and the onset of rigor mortis. The tenderness of pieces of meat can be controlled if this time is known. A relatively long stomach emptying time leads to meat which is drier and harder in relative terms given the same length of time between the end of stomach emptying and the beginning of boning;

the stomach emptying time and the microbiological quality of the slaughter product, particularly as a result of the influence which the stomach emptying time has on the viscosity and type of faeces or intestinal filling. To achieve a high-quality fresh product, the stomach emptying time has to be relatively short; and in the case of poultry, the stomach emptying time and the extent to which feathers adhere to the skin of the poultry. In the event of a relatively long stomach emptying time, the feathers adhere more strongly and a higher scalding temperature or a longer scalding time has to be selected to achieve the same feather-removal process.

FIG. 3 shows a conveyor 60 onto which a container 24 holding poultry is placed in the direction of arrow 62, upstream of a feed device 64. The feed device 64, which is provided with conveyor means which are not shown in more detail but are known per se, leads to a distributor device 66 which comprises one or more movable walls, which are not shown in more detail and can be positioned, in a controllable manner, in such a way that poultry which has been fed to the distributor device 66 via the feed device 64 passes through a gas stunning device 68 with one or more compartments and a conveyor 69 or moves onto a conveyor 70, as desired. One or more different gases can be supplied to the gas stunning device 68, if appropriate in different compositions in different compartments, which gases are supplied from tanks 72a, 72b and/or 72c. The gas stunning device 68 and the conveyor 70 move poultry on an endless carousel conveyor 74 which is in the general shape of a trough and around which there are one or more people who hang the optionally stunned poultry from carriers of a conveyor track 78, which are moving in the direction of arrow 76 and are not shown in more detail. The conveyor track 78 may or may not guide the poultry through an electrical stunning device 80 of a known type, as desired. For this purpose, a controllable switch 81 is provided in the conveyor track 78, which switch can be used to guide the poultry to a conveyor track section 79 which leads through the electrical stunning device 80 or to a conveyor track section 78b which forms a bypass past the electrical stunning device 80.

The stunning arrangement shown in FIG. 3 offers the options of gas stunning, electrical stunning or no stunning. In the case of gas stunning, it is possible to select various stunning gases, optionally in combination, in various concentrations. By selecting a variable conveying speed of the conveyor 69, it is possible to select the residence time of the slaughter animals in the gas stunning device 68. It is also possible to select the residence time of the slaughter animals in the electrical stunning device 80 by adjusting the conveying speed of the conveyor track 78. In addition, it is possible to select the electric voltage, current and frequency in the electrical stunning device.

A data-processing system 82, which may form part of the data-processing systems 12 or 50 discussed above, or may be coupled thereto, uses incoming data, symbolized by dashed line 84, to control the distributor device 66, the composition of the stunning gas or the stunning gases in the gas stunning device 68, the conveying speed of the conveyor 69, the conveying speed of the conveyor track 78, the switch 81 and the adjustment of the electrical parameters in the electrical stunning device 80, as respectively symbolized by dashed lines 66a, 68a, 69a, 78a, 82a and 80a. The incoming data relate, for example, to a property of a group of slaughter animals.

Generally, gas stunning in the gas stunning device 68 will be selected if a relatively small number of blood traces and broken bones and a good level of exsanguination are desired, factors which are important, in particular, if boning is carried out in a further processing. If a relatively rapid processing is desired, it is possible to use a gas mixture of argon and carbon dioxide, which causes convulsions during stunning. This results in the pH of the meat falling quickly after death of the slaughter animal and in a quicker onset of rigor mortis, which may be of benefit to the tenderness of the meat. If convulsions are undesirable or unnecessary (for example if the slaughter animal had already undergone a long stomach emptying time, which information may be fed to the data-processing system 82), it is also possible to use a specific gas mixture of oxygen and carbon dioxide, so that convulsions do not occur and the onset of rigor mortis is slower. Furthermore, it is possible to select a (possibly slight) stunning in connection with requirements of a religious nature or in connection with the manageability of the slaughter animal. If the slaughter animals have become numb during their time in the waiting area or during transport, which it is possible to establish, for example, from measuring the temperature in the waiting area or measuring the heart rate or temperature of individual slaughter animals (which information can be fed to the data-processing system), they will take in gas relatively slowly in a gas stunning device, with the result that to achieve the desired level of stunning, a lower conveying speed has to be selected in the gas stunning device and/or a higher concentration of the stunning gas or gases has to be set.

If electrical stunning is selected, this generally leads to lower stunning costs than gas stunning, since electricity is cheaper than gas. In this case, a high current intensity is selected if, for example, a high throughput and/or a relatively low exsanguination is desired (leading to a higher weight of slaughter products). If relatively few traces of blood and broken bones are desired, the current intensity has to be relatively low and/or the residence time has to be short.

Selection of a specific gas stunning or specific electrical stunning can also be determined by the desired colour of the meat, the desired exsanguination time or extent or, in the case of poultry, the desired ease of plucking.

Figure 4A:
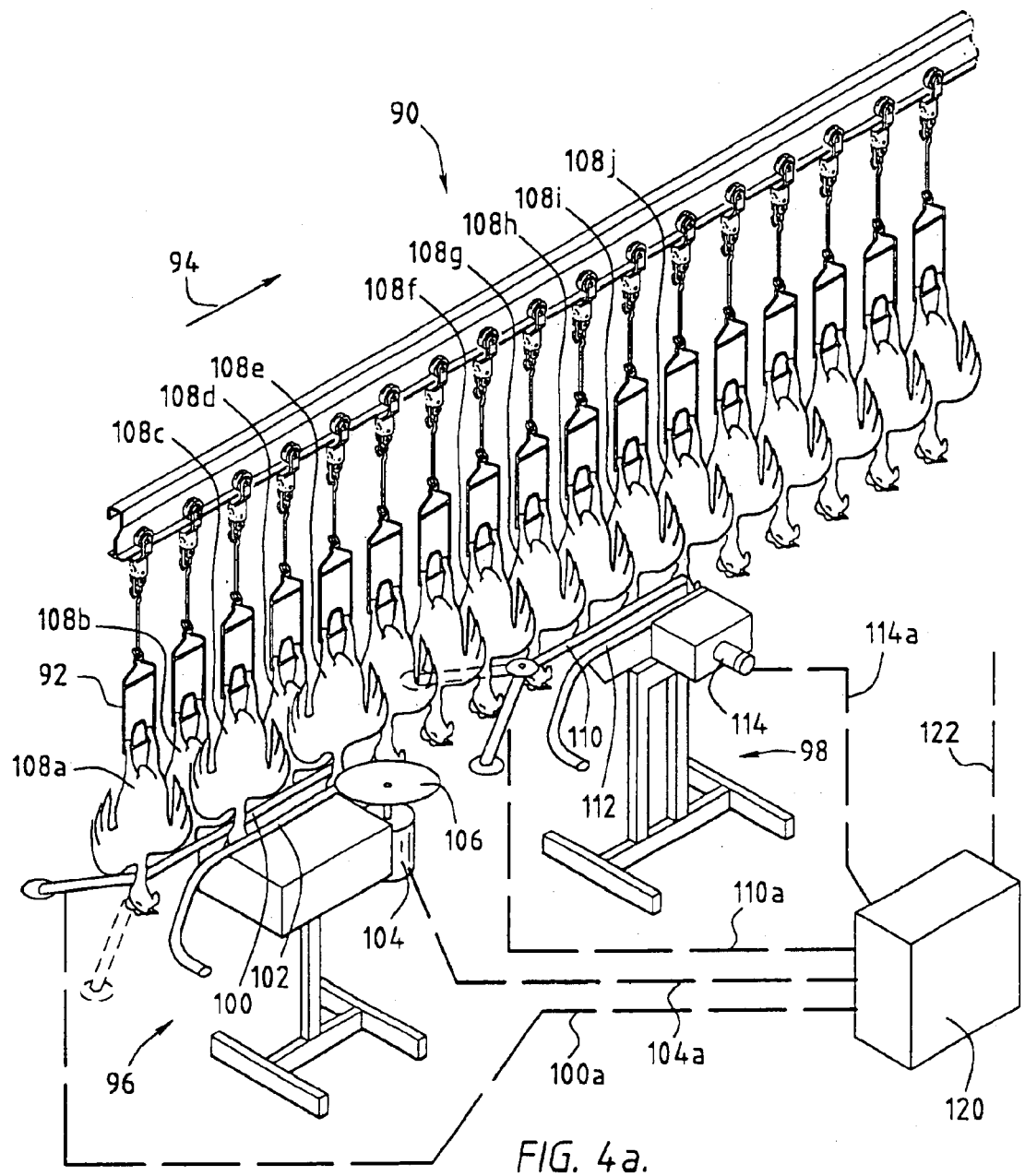
FIG. 4a shows a diagrammatic, perspective view, partially in the form of a block diagram, of an arrangement for killing poultry in a meat-processing factory.
Figure 4B:
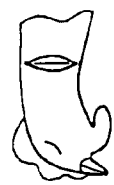

FIG. 4a shows a conveyor track 90 which is used to convey poultry hanging from hooks 92 by its legs, in the direction of arrow 94. Two processing stations 96 and 98 for opening one or more blood vessels in the neck of the poultry are arranged along the path of the poultry. The first processing station, referred to below as cutting processing station 96, comprises a frame with two guides 100 and 102 and a circular blade 106, which is driven by means of a motor 104 and is arranged at the end of the guides 100, 102. A neck of a bird which is guided between the guides 100, 102 is cut open by the circular blade 106, as illustrated in FIG. 4b. Part of the guide 100 can be pivoted between the position shown in FIG. 4a and a second position indicated by dashed lines with the aid of drive means (not shown in more detail), with the result that, as desired, a bird moves in between the guides 100, 102 so that the neck is cut open (birds 108a, 108c and 108e) or moves past the cutting processing station 96 on that side of the guide 100 which is remote from the guide 102 (birds 108b and 108d), so that the neck is not cut open. As an alternative (not shown in more detail), the cutting processing station 96 may comprise two blades which are each arranged on opposite sides of the guides 100. This arrangement of blades leads to the neck of a bird being cut open at the front (throat) and on one side.

Figure 4C:
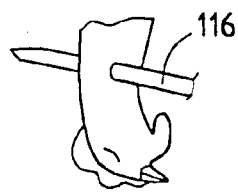

The second processing station, which is referred to below as the sticking processing station 98, comprises a frame with two guides 110 and 112 and a sticking blade 116, which is driven by an actuator 114 and is arranged in the vicinity of the end of the guides 110, 112. Means (not shown in more detail) are provided for synchronizing the movement of the sticking blade 116 with a neck of a bird which is moving forwards between the guides 110, 112. The sticking blade 116 is stuck through a neck of a bird which is guided between the guides 110, 112, as shown in FIG. 4c, for example. Part of the guide 110 can be pivoted between the position shown in FIG. 4a and a second position shown in dashed lines, with the aid of drive means (not shown in more detail), with the result that, as desired, a bird moves between the guides 110, 112 so that the blade is stuck through the neck, or moves past the sticking processing station 98 on that side of the guide 110 which is remote from the guide 112 (birds 108f–108j), so that the blade is not stuck through the neck.

In another processing station, which is not shown in FIG. 4a and may be arranged either upstream or downstream of the cutting processing station 96 or the sticking processing station 98, it is possible for a blood vessel of a bird to be opened manually if this is required, for example on religious grounds (halal) or if killing by means of cutting or sticking as shown in FIG. 4b or 4c is undesirable. This is the case, for example, for a "traditional" slaughter product, which involves the slaughter animal being sold with its head attached, sticking usually being carried out in the beak.

A data-processing system 120, which may form part of the data-processing systems 12, 50 of 82 described above or may be coupled thereto, uses incoming data, symbolized by dashed line 122, to control the position of the pivotable part of the guide 100 of the cutting processing device 96, the position of the pivotable part of the guide 110 of the sticking processing device 98, and the actuation of the circular blade 106 and the sticking blade 116, symbolized by the dashed lines 100a, 110a, 104a and 114a, respectively.

It is decided whether to cut or stick mechanically or to use a manual operation on the basis of the weight, number per unit time, quality, desired level and desired speed of exsanguination. The question of whether slaughtering is being carried out according to ritual instructions ("kosher" or "halal") also plays a role. The quality may be determined at an earlier time by means of an image-processing system which assesses, for example, the contour of the slaughter animal and the set of feathers.

It should also be noted that with similar processing devices arranged in series in a slaughtering process, such as the cutting processing device 96 and the sticking processing device 98, the processing device which is arranged furthest upstream can operate selectively, while the processing device arranged furthest downstream is not selective and thus acts on all the slaughter products. In this way, the processing device arranged furthest downstream operates as a safety feature in the event of the processing device arranged further upstream failing.

Figure 5:
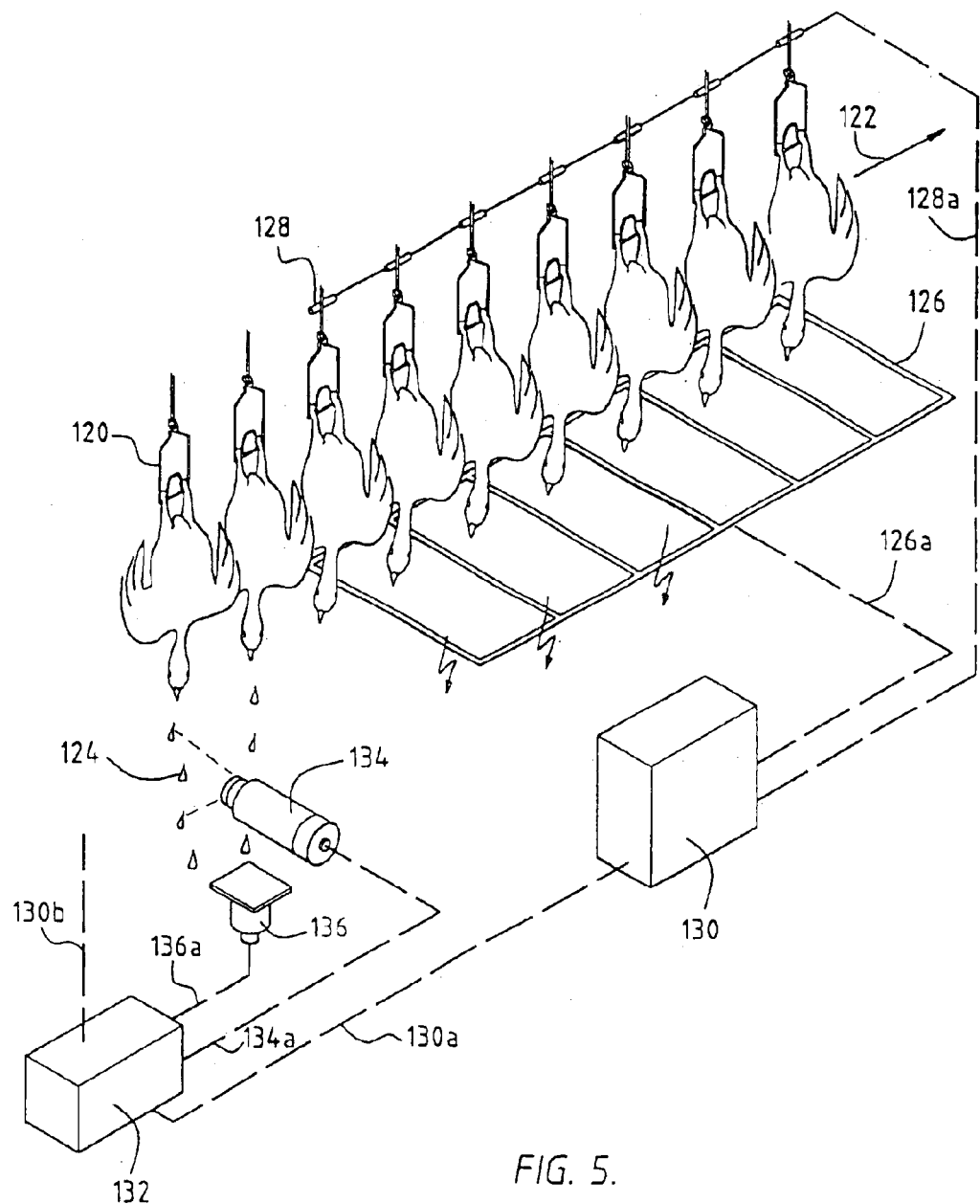
FIG. 5 shows a diagrammatic, perspective view, partially in the form of a block diagram, of an arrangement for electrical stimulation of poultry.

FIG. 5 shows poultry which is hanging by its legs from hooks 120 of a conveyor (not shown in more detail) and is being conveyed in the direction of arrow 122. At least one blood vessel of the poultry has been opened in a processing carried out previously, so that blood 124 is being released from the poultry. A ladder-shaped electrode 126 is arranged beneath the conveyor, in the path of the necks of the birds. In addition, each separate hook 120 comes into electrical contact with electrodes 128 which can be energized individually as it covers its path. As indicated by dashed lines 126a and 128a respectively, the electrodes 126 and 128 are connected to an electric power source 130, which can be used to adjust the parameters (such as the duration, level, frequency, voltage) of the electric current between the electrodes 126, 128. The power source 130 is controlled in turn, as symbolized by a dashed line 130a, by a data-processing system 132 which may form part of the data-processing systems 12, 50, 82 or 120 discussed above or may be coupled thereto. Furthermore, information is fed to the data-processing 132, as symbolized by the dashed line 130b. A temperature sensor 134 and a blood composition sensor 136 are also coupled to the data-processing system 132, as symbolized by dashed lines 134a and 136a, respectively.

In the arrangement shown in FIG. 5, the slaughter animals may or may not be subsequently stunned electrically, as desired, in order to avoid convulsions, or may be subjected to electrical stimulation in order to contribute to the process of hanging. If electrical stimulation is carried out, its intensity, such as the duration and the level of the parameters of the electric current, for one slaughter animal or a group of slaughter animals is selected as a function of the type of slaughter product, in which case information concerning the breed and feeding, and information relating to the stomach emptying process, the stunning process, the initial cutting process and the desired further processing play a role. Measuring the temperature of the blood using the temperature sensor 134 may reveal that this temperature is above average, which may indicate a slaughter animal which has been subject to stress, the meat from which is generally less tender. If required, the slaughter animal in question may be subjected to electrical stimulation in order to improve the tenderness of the meat, depending on requirements. The blood composition sensor 136 provides data, for example, about the blood plasma and number of blood cells, on the basis of which it is possible to draw conclusions concerning the quality of the slaughter product, and, for example, the presence of diseases, in which connection it is possible for the data-processing system 132 to consult historical data.

Figure 6:
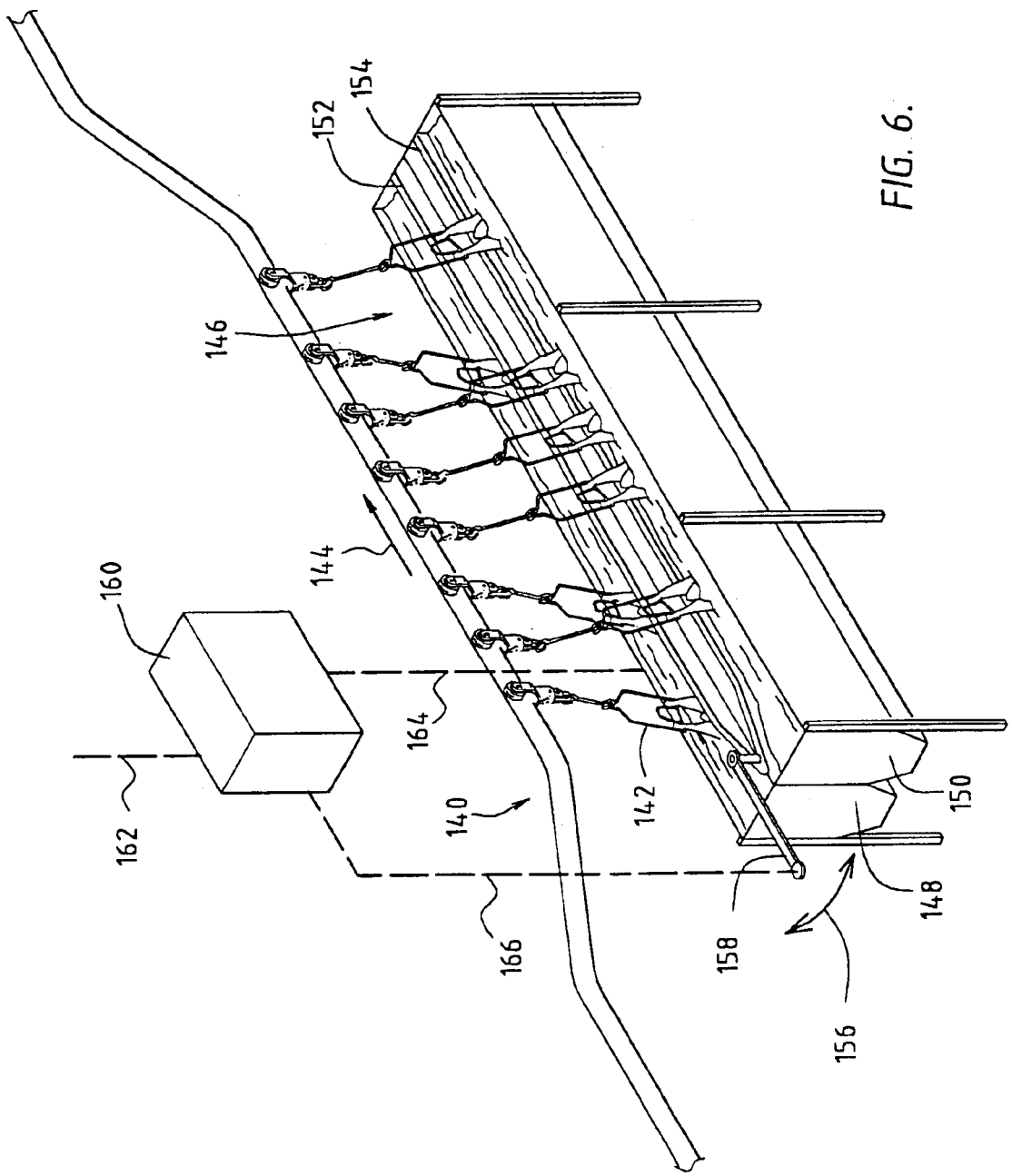
FIG. 6 shows a diagrammatic, perspective view, partially in the form of a block diagram, of an arrangement for scalding poultry.

FIG. 6 shows a section of a conveyor 140 which can be used to guide poultry hanging by its legs in hooks 142 through a scalding device 146, in the direction of arrow 144. The scalding device 146 comprises two reservoirs 148, 150, which are each filled with a scalding liquid and are preferably at different temperatures. Guides 152 and 154 are arranged above the respective reservoirs 148, 150. Each individual bird or a collection of birds can be guided to one of the reservoirs 148 or 150 in order to undergo a scalding process with the aid of a controllable arm 158 which can pivot in the directions of double arrow 156.

The length of time for which the birds remain in a reservoir can be adjusted, for example on the basis of the thickness of the set of feathers, by adjusting the conveying speed of the conveyor 140. Obviously, it is also possible to omit a scalding process by guiding the appropriate birds around the scalding device 146, in a manner which is known per se. It is also possible for the reservoirs 148, 150 to be arranged one behind the other rather than next to one another, in which case the birds can, as desired, be guided only through the first reservoir 148, only through the second reservoir 140, through both reservoirs 148, 150 or through neither of the reservoirs.

A data-processing system 160, which may form part of the data-processing systems 12, 50, 82, 120 or 132 discussed above or may be coupled thereto, uses incoming data, symbolized by dashed line 162, to control the temperature of the scalding liquid in each of the reservoirs 148, 150 (symbolized by dashed line 164) and the position of the pivot arm 158 (symbolized by dashed line 166), in order to carry out the optimum scalding process for each individual bird or a group of birds. In relation to processings which are to be carried out later, it is possible, for example, to carry out scalding at a temperature and/or for a period which are such that:

the epidermis may or may not be present after the scalding process (leading, inter alia, to different cooking properties and coating properties of the skin),
the meat is a specific colour after scalding, and/or
a stipulated ease of plucking of the feathers is achieved.

Furthermore, by selecting the temperature, the time and duration of scalding, it is possible to influence the process of hanging.

Figure 7:
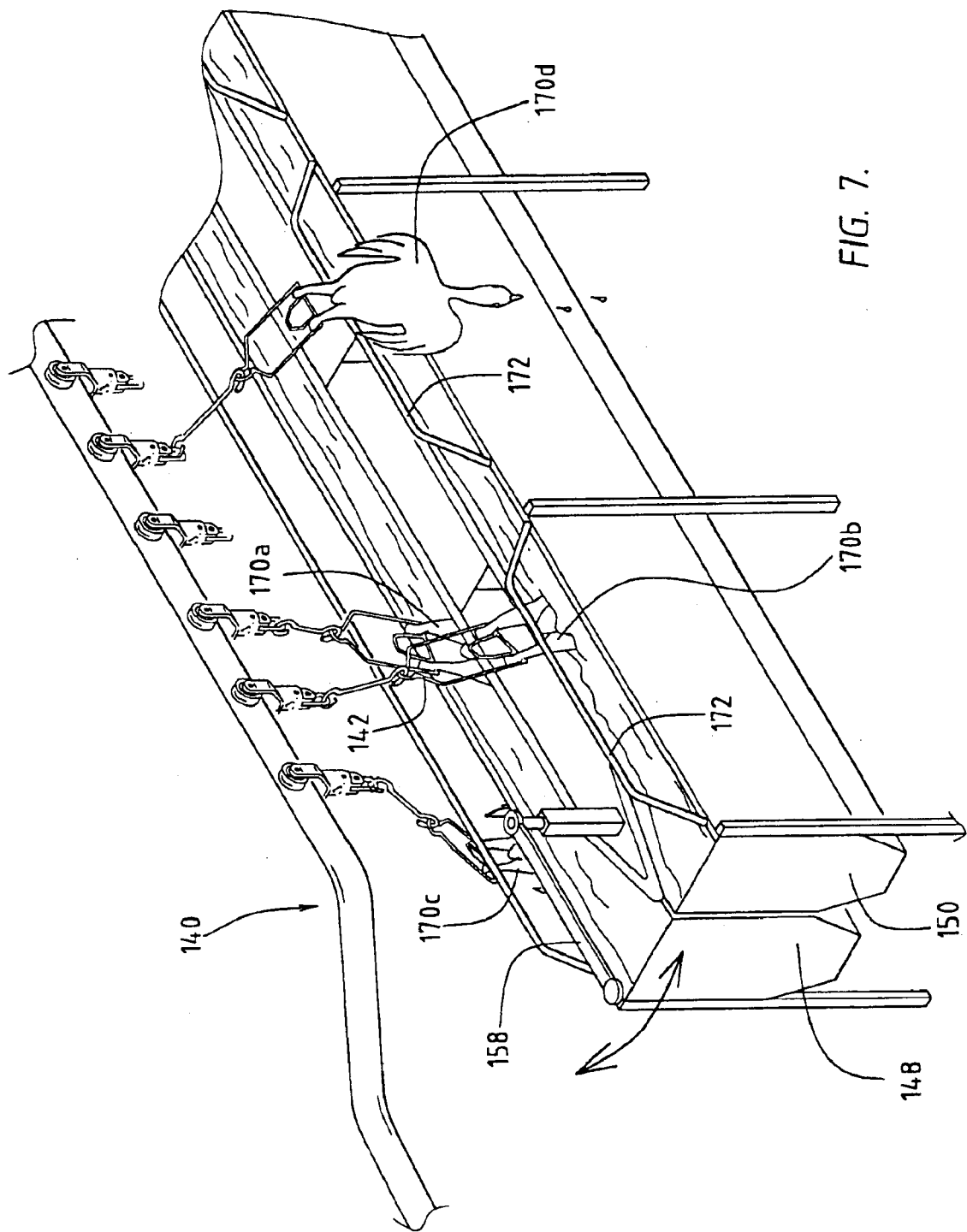
FIG. 7 shows a variant of the arrangement from FIG. 6, on an enlarged scale.

As illustrated in FIG. 7, it is possible for the pivot arm 158 to be adapted in such a manner that birds can be guided not only into reservoir 148 (bird 170a) or into reservoir 150 (bird 170b), but may also be guided past the reservoirs 148, 150 (bird 170c). It may also be desirable for birds to be removed early from a reservoir (bird 170d), for which purpose guide parts 172 are provided.

Figure 8:
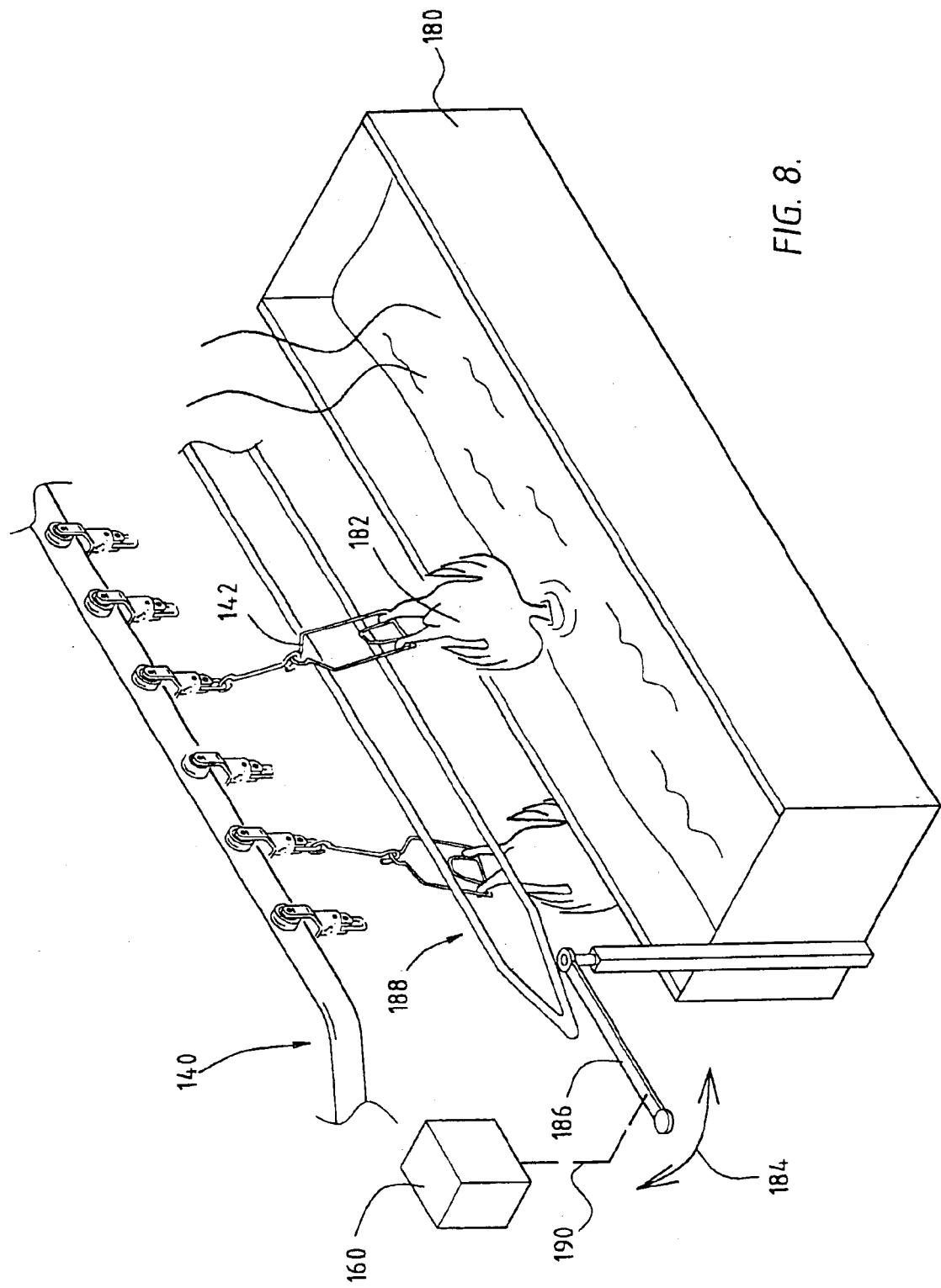
FIG. 8 shows another variant of the arrangement from FIG. 6, on an enlarged scale.

FIG. 8 shows a scalding reservoir 180 in which the head of a bird 182 may undergo further scalding in order for the feathers present thereon to be removed more easily and more successfully. This is required in particular for "traditional" slaughter products, in order for the presentation of the slaughter product to be improved. With other birds, this may be required if the head of these birds is intended to be used as animal fodder. An arm 186 which is to be pivoted in the directions of double arrow 184 can guide slaughter products to one of two sides of a double guide 188 as desired, in order for the head of the slaughter product to be optionally guided through the scalding reservoir 180.

The pivot arm 186 may be controlled from the data-processing system 160, as symbolized by the dashed line 190, on the basis of data previously recorded for the slaughter product.

Figure 9:
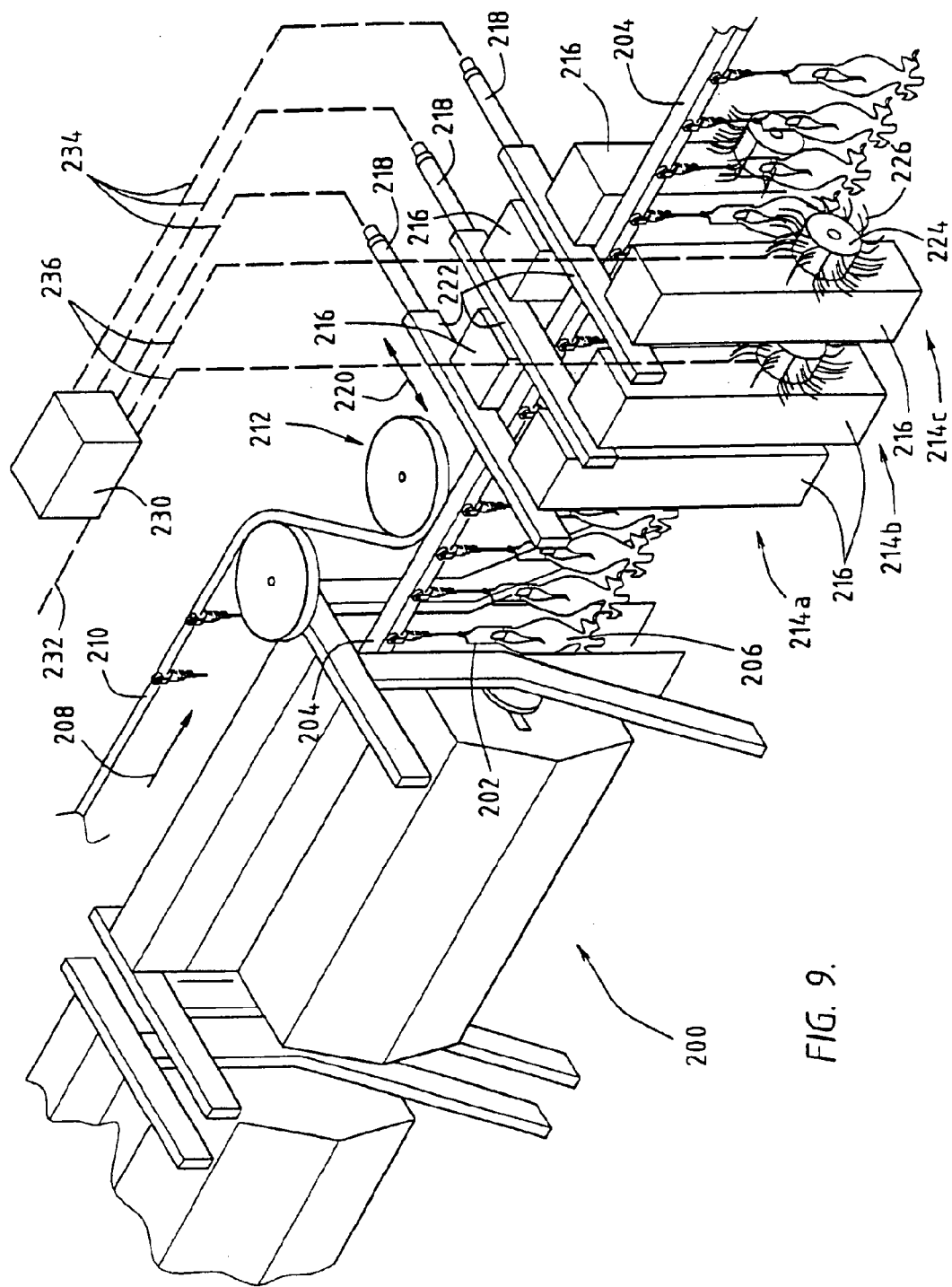
FIG. 9 shows a diagrammatic, perspective view, partially in the form of a block diagram, of an arrangement for plucking poultry.

FIG. 9 shows a conventional plucking device 200, through which birds 206 which are hanging by their legs from hooks 202 of a conveyor track 204 are conveyed in the direction of arrow 208. If it is undesirable for one or more birds to pass through the plucking device 200, these birds may be guided around the plucking device 200 via a conveyor track 210 and may be transferred into the conveyor track 204 downstream of the plucking device 200, by means of a transfer device 212 which is not shown in more detail but is known per se.

By way of example, three processing devices 214a, 214b and 214c are arranged along the conveyor track 204, downstream of the transfer device 212. Each of the processing devices 214a–214c comprises two columns 216 which can be moved towards and away from one another, in a controllable manner not shown in more detail, by a drive member 218, in the respective directions of double arrow 220, along a bar 222, the distance of one column 216 of one of the processing devices 214a–214c to the conveyor track 204 always being substantially equal to the distance of the associated other column 216 from the conveyor track 204. Each column 216 bears a drum-like component 224, which can be controllably rotated by means of a drive (not shown in more detail) and is provided, on a cylindrical surface thereof, with flexible fingers 226 which project substantially radially and are, for example, of the same type as the fingers which are active in the plucking device 200 for plucking the birds 206. As a result of the columns 216 moving towards the conveyor track 204, the fingers 226 can be brought into contact with the birds 206, and as a result of the columns 216 moving away from the conveyor track 204 can be moved out of the path of the birds 206. It is thus possible for the fingers 226 to be brought into contact with the birds 206 as desired for each individual bird 206 or for each group of successive birds 206, the drum-like component 224 rotating at a controllable speed. In this way, it is possible, on the one hand, for the birds 206 to be plucked or plucked further and, on the other hand, for the fingers 226 to act mechanically on the birds 206, making the meat more tender.

A data-processing system 230, which may form part of said data-processing systems 12, 50, 82, 120, 132 or 160, or may be coupled thereto, uses incoming data, symbolized by dashed line 232, to control the positioning of the columns 216, symbolized by dashed lines 234, and driving of the drum-like component 224 (stationary or rotating; direction of rotation; speed of rotation), symbolized by dashed lines 236. The incoming data may be derived from or relate to processings carried out earlier on (a) specific bird(s), such as a visual inspection carried out after plucking, which indicates that feathers are still present and therefore additional plucking is required, or, for example, the fact that an electrical stimulation process has not been carried out owing to a defective machine, so that a mechanical tenderness-promoting processing has to be carried out using the fingers 226. The incoming data may also relate to processings to be carried out on the birds 206 at a later time, such as the need for a specific slaughter product or the availability of a downstream processing, with the result that the processing devices 214a, 214b or 214c may or may not have to be activated.

Figure 10:
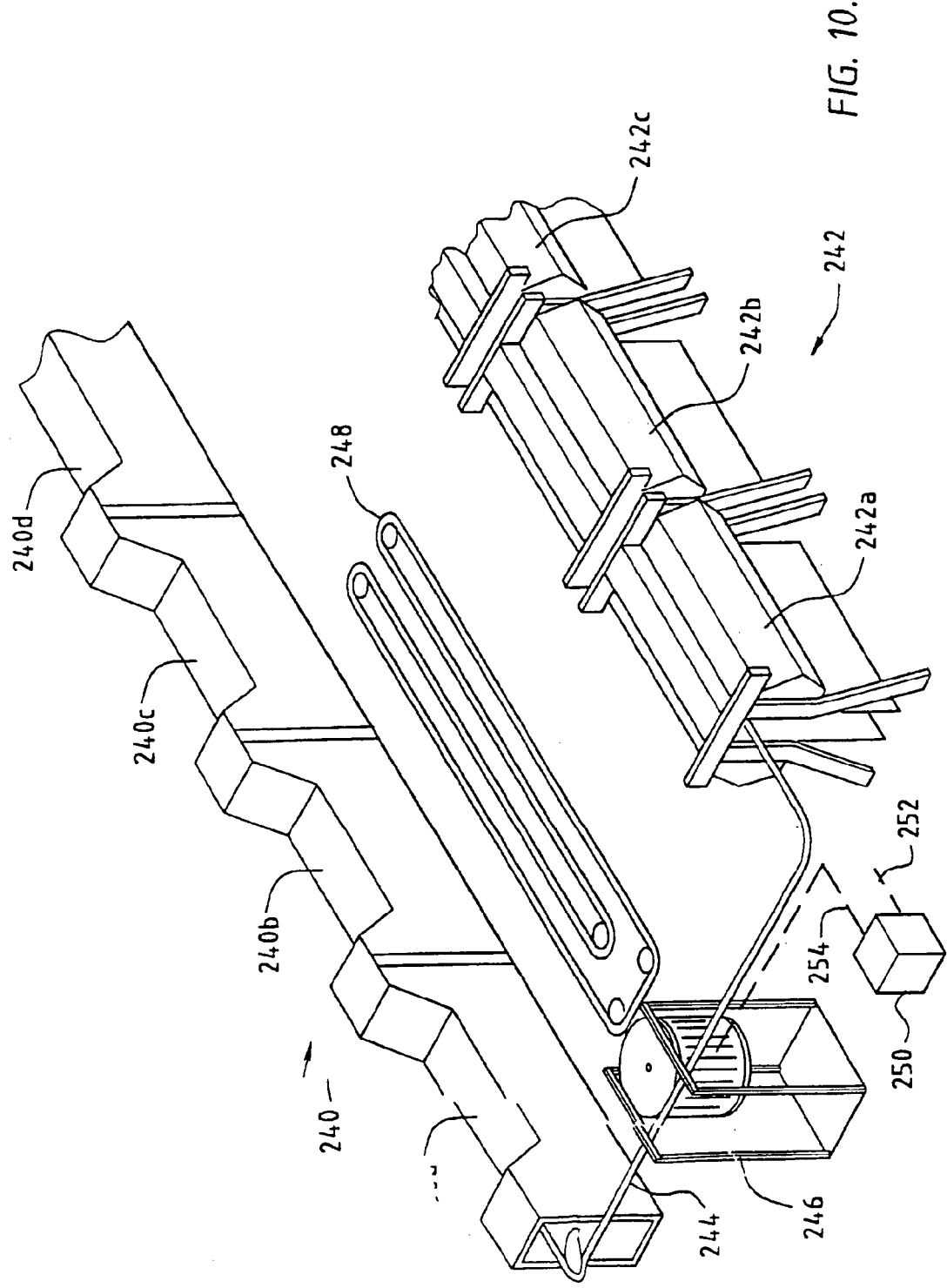
FIG. 10 shows a diagrammatic, perspective view, partially in the form of a block diagram, of a scalding device and a plucking device and equipment arranged between them.

FIG. 10 shows a scalding device 240 and a plucking device 242 for poultry. In a manner not shown in more detail, a conveyor track 244 conveys poultry from the scalding device 240 to the plucking device 242. Along the conveyor track 244, there is a transfer device 246, by means of which poultry can, if desired, be transferred from the conveyor track 244 to an endless buffer conveyor track 248 in order to extend the time between the scalding process carried out in the scalding device 240 and the plucking process which is to be carried out in the plucking device 242. The buffer conveyor track 248 may also be used to gather together birds with specific properties which are spread out over the conveyor track 244, in order for these birds then to be supplied as a group to the plucking device 242, which may be set appropriately, as desired.

With regard to FIGS. 9 and 10, it should also be noted that the diversion conveyor track 210 shown in FIG. 9 can be used not only to avoid passing through the entire plucking device 242, but also, in a modified configuration which is not shown in more detail, to avoid passing through one or more sections 242a, 242b, 242c, . . . of the plucking device 242, with the result that the effective plucking time and plucking intensity can be reduced if necessary. A similar arrangement (not shown in more detail) with one or more diversion conveyor tracks can be used with a scalding device comprising sections 240a, 240b, 240c, 240d, . . . , in order for it to be possible to reduce the effective scalding time and scalding intensity if necessary. Furthermore, a similar arrangement (not shown in more detail) with one or more diversion conveyor tracks can be used to provide diversions around one or more of the processing devices 214a–214c.

A data-processing system 250, which may form part of said data-processing systems 12, 50, 82, 120, 132, 160 or 230, or may be coupled thereto, uses incoming data, symbolized by dashed line 252, to control the transfer of individual birds from the conveyor track 244 to the buffer conveyor track 248 and vice versa, symbolized by dashed line 254. The incoming data may emanate from or relate to processings previously carried out on (a) specific bird(s), such as data which represent a measure of the tenderness and which can be used to decide to send a bird through the buffer conveyor track 248 one or more times in order to increase its tenderness. The incoming data may also relate to processings to be carried out on the birds at a subsequent time, such as the need for a specific slaughter product or the availability of a downstream processing, with the result that the transfer device 246 may or may not have to be activated.

Figure 11:
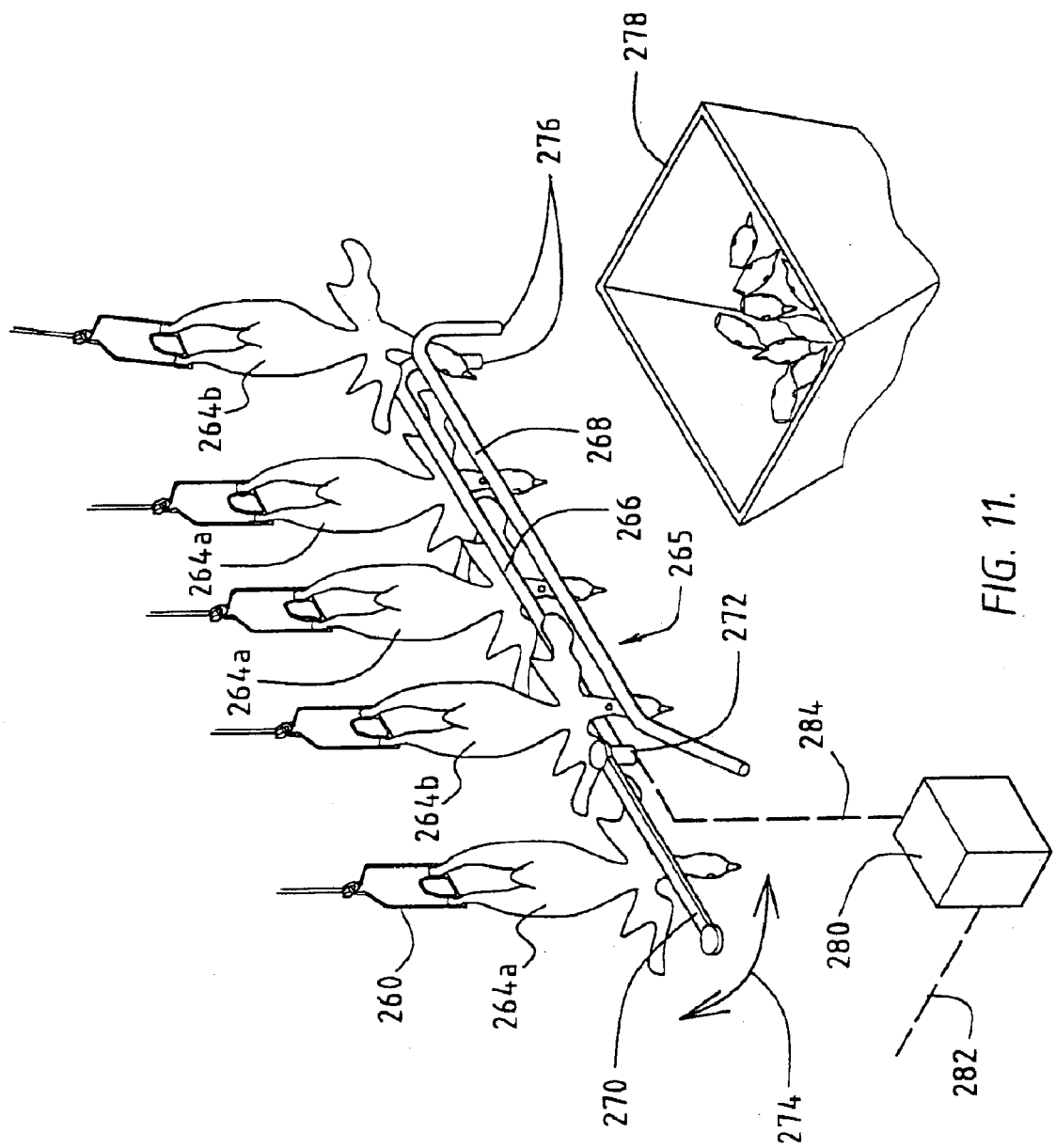
FIG. 11 shows a diagrammatic, perspective view, partially in the form of a block diagram, of a head-pulling device.

FIG. 11 shows a number of birds which are hanging from hooks 260 by their legs and are conveyed in the direction of arrow 262 with the aid of a conveyor which is not shown in more detail but is known per se. The necks of birds 264a have been stuck for exsanguination purposes, while birds 264b have had their necks cut. A head-pulling device 265 comprises a set of guides 266 and 268. At its upstream end, the guide 266 is provided with a pivot arm 270 which is driven in a manner not shown in more detail and can be pivoted to and fro about a pivot 272 in a controllable manner, in the directions of double arrow 274. It is thus possible, by setting a suitable pivot position of the pivot arm 270, for the necks of birds to be guided between the guides 266, 268 or on that side of the guide 266 which is remote from the guide 268. The distance between the guides 266, 268 is selected in such a manner that the head of birds whose necks are guided between these guides cannot pass through the guides. In addition, the downstream ends 276 of the guides 266, 268 are bent downwards substantially at right angles, so that the head of a bird whose neck has moved in between the guides 266, 268 is pulled off at the ends 276 of the neck and falls into a collection container 278. In FIG. 11, only the birds 264b which have been provided with a neck cut are guided between the guides, so that they lose their heads in the head-pulling device 265. The birds 264a retain their head as they move past the head-pulling device 265.

A data-processing system 280, which may form part of said data-processing systems 12, 50, 82, 120, 132, 160, 230 or 250, or may be coupled thereto, uses incoming data, symbolized by dashed line 282, to control the pivot position of the pivot arm 270, symbolized by dashed line 284. The incoming data may emanate from or relate to processings which have previously been carried out on (a) specific bird(s), such as the killing process in which it is noted whether the neck was cut or stuck for each individual bird. The incoming data may also relate to processings which are to be carried out later on the bird, such as optionally carrying out various processings making the birds ready-to-cook, such as cutting legs, opening the carcass, removing the viscera, removing the neck or passing through a specific cooling regime.

Figure 12:
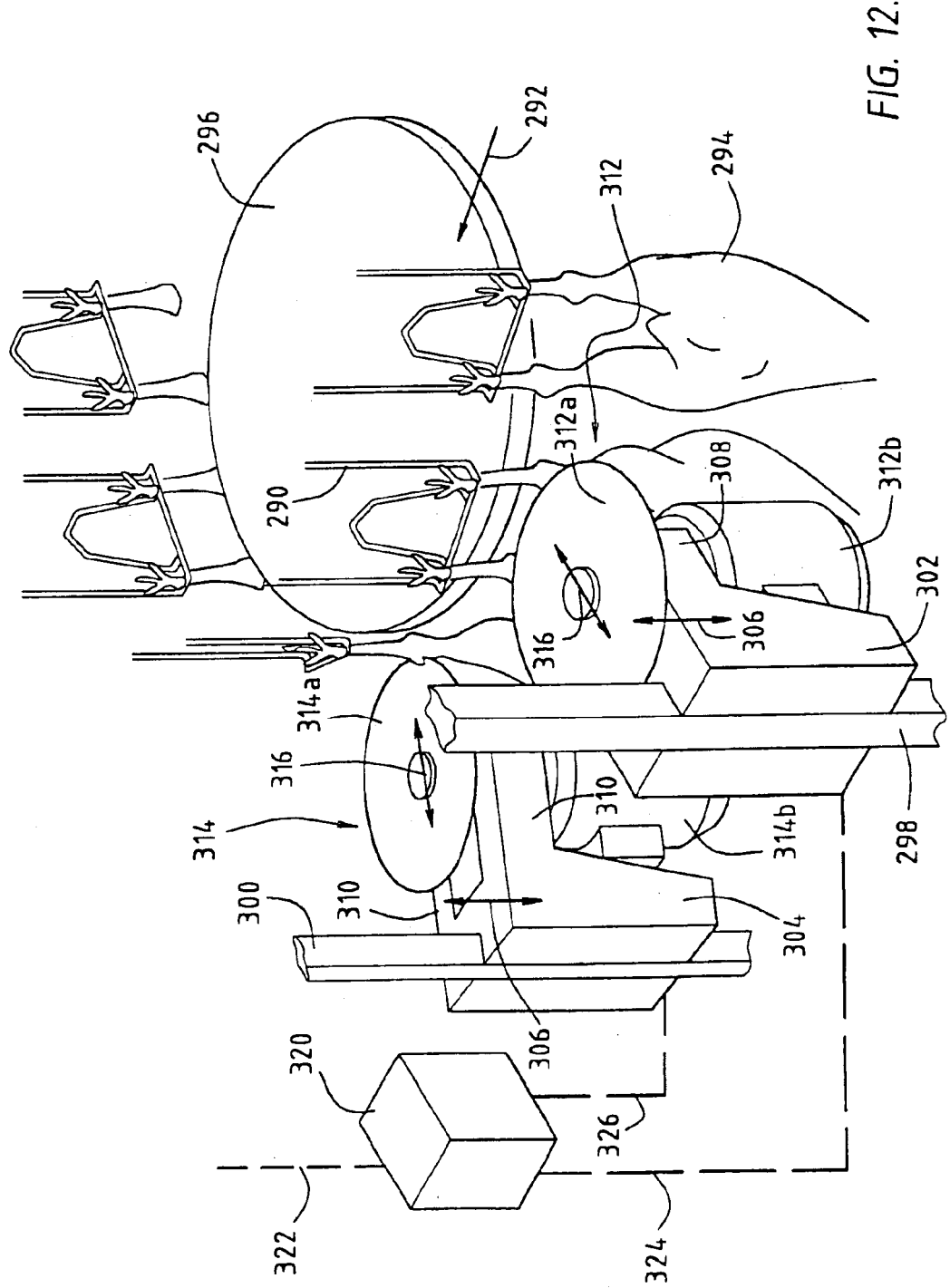
FIG. 12 shows a diagrammatic, perspective view, partially in the form of a block diagram, of a leg-cutting device.

FIG. 12 shows a leg processing station in which a portion of the legs of birds 294 which are hanging from hooks 290 and are being conveyed in the direction of arrow 292 can be cut off. In the leg processing station, the legs of the birds rest with the drumstick against a disc 296 which may either be stationary or rotate about its centre, in the direction of the arrow 292. The leg processing station further comprises a frame (not shown in more detail) with columns 298 and 300. With the aid of drive means (not shown in more detail), support units 302 and 304 can be moved in a controllable manner along the respective columns 298 and 300, in the directions of double arrow 306. Each support unit 302, 304 comprises respective arms 308, 310. With the aid of drive means (not shown in more detail), cutting units 312 and 314 can be moved in a controllable manner along the respective arms 308, 310, in the directions of double arrow 316. The cutting units 312, 314 each comprise a rotating blade 312a and 314a, respectively, driven by a motor 312b and 314b, respectively. The direction and speed of rotation of the blades 312a and 314a is selected according to the desired cutting result.

The location where the legs are cut through can be adjusted in the leg processing station by selecting a specific height setting of the support unit 302 or 304 which is to be put into operation, the rotating blades 312a and 314a being located outside the path of the birds. Then, the cutting units 312 and 314 can be moved along the arms 308 and 310, respectively, as desired for each individual bird, into the path of the bird's legs, in order for the intended part of the legs to be cut off. It is also possible for the cutting unit 312 to be positioned permanently in the path of the bird's legs, in order for a first part of the legs of all the birds which move past to be cut off, and for cutting unit 314 only to be activated selectively, in order for a second part of the legs of selected birds to be cut off. Obviously, cutting unit 312 may also be activated selectively in order for a first part of the legs of selected birds to be cut off, the rotary blade 314a of the cutting unit 314 being located permanently in the path of the bird's legs in order for a section of the first part of the legs of the birds which move past to be cut off, provided they have not been acted on by the cutting unit 312. The cutting unit 314 then also functions as a back-up unit for the situation in which the cutting unit 312 inadvertently, as a result of control errors or a mechanical problem, misses legs or only cuts part way through. Furthermore, it should be noted that although in FIG. 12 the cutting units are arranged immediately next to one another, they may also, and even preferably, each be used in combination with various other processings, in order still to be able to establish a definitive leg length at as late a time as possible. As an alternative to rotating blades, it is also possible to use water jets, saws or shearing blades to cut through the legs as intended.

In the embodiment shown in FIG. 12, the cutting units 312, 314 are moved towards and away from the birds. It will be clear that in an alternative embodiment (not shown in more detail) the cutting units may also be arranged in a stationary position (in the horizontal direction), in which case the birds are moved towards the cutting units in order to cut off the legs. Furthermore, the leg processing station shown in FIG. 12 comprises two cutting units which are positioned one behind the other. It will be clear that an alternative embodiment (not shown in more detail) may also comprise a single cutting unit with at least two blades which can be moved individually in a selective and controllable manner.

A data-processing system 320, which may form part of said data-processing systems 12, 50, 82, 120, 132, 160, 230, 250 or 280, or may be coupled thereto, uses incoming data, symbolized by dashed line 322, to control the adjustment of the support units 302 and 304 along the columns 298 and 300, respectively, and the adjustment of the cutting units 312 and 314 along the arms 308 and 310, respectively, symbolized by dashed lines 324 and 326, respectively. The incoming data may emanate from or relate to processings previously carried out on (a) specific bird(s), such as a specific manner of stunning, a specific manner of making an exsanguination cut, or exposure to a specific scalding regime. The incoming data may also relate to processings to be carried out later on the birds, such as carrying out a specific packaging processing, for example dressing or trussing, or carrying out a specific part processing, such as making drumsticks, or carrying out a leg boning processing.

FIG. 13a shows a section of a wall 330 in which a control groove 332 is formed. A bracket 334 can be moved along the wall 330 in a manner not shown in more detail, in a direction indicated by an arrow 336. The bracket 334 comprises a frame 338 in which a hook 344 is mounted, which can tilt about a pin 342 in the directions of double arrow 340. The hook 344 is fixedly connected to an arm 346, at the free end of which there is a roller 348 which can rotate freely and is located in the control groove 332 of the wall 330. It is thus possible to control the tilting of the hook 344 by suitably selecting the direction of the control groove 332.

The hook 344 interacts with a hook 350 from which a carcass of a bird 352 is hung by its legs. The hook 350 is moved synchronously with the bracket 334 in the direction of the arrow 336. As shown by FIG. 13a, the hook 344 will take over the bird 352 from the hook 350 when the control groove 332 runs downwards, as seen in the direction of the arrow 336, after which the hook 350 will continue on its way empty.

FIG. 13b shows how a bird 352 hanging from the hook 344 is moved along a guide 354 which extends along the wall 330. In this area, the control groove 332 is provided with switch 356 having a substantially U-shaped part 356b which can be pivoted about a pin 356a with the aid of a drive (not shown in more detail), providing the option of connecting a control groove part 332a or a control groove part 332b to the control groove 332 in a controllable manner, and thus causing the roller 348 to follow different paths, so that it is possible to adjust the tilted position of the hook 344 as desired and for each individual bird 352. FIG. 13c shows the switch 356 in a first position, in which the control groove part 332a is connected to the control groove 332, while FIG. 13e shows the switch 356 in a second position, in which the control groove part 332b is connected to the control groove 332.

In FIG. 13b, the switch 356 are in the first position as shown in FIG. 13c, the control groove part 332a extending substantially parallel to the longitudinal direction of the guide 354, so that the bird 352 remains hanging in the hook 344. By contrast, in FIG. 13d the switch 356 are in the second position as shown in FIG. 13e, in which the control groove part 332b extends upwards as seen in the direction of the arrow 336, with respect to the longitudinal direction of the guide 354. This has the result, as illustrated in FIG. 13f, of moving the hook 344 downwards, with the bird 352 being stopped and moved out of the hook 344 by the guide 354. Therefore, the assembly of the switch 356, the control groove parts 332a and 332b and the guide 354 provide a means of selecting whether or not to release the bird 352 from the hook 344 in a controllable manner. It is possible to provide a plurality of assemblies one behind the other along the wall 330, in order for it to be possible to release the bird 352 at various places. It is also possible for the release to be brought about by controlling the switch 356 in conjunction with a suitable control groove 332 in such a manner that only the desired slaughter products are taken over from a hook 350, or only slaughter products hanging by the tail or the head are transferred (if the shape of the hooks 344 and 350 is adapted). As an alternative to releasing the slaughter products, they may also be transferred by the hook 344 to a following hook.

A data-processing system 360 (FIG. 13b), which may form part of said data-processing systems 12, 50, 82, 120, 132, 160, 230, 250, 280 or 320, or may be coupled thereto, uses incoming data, symbolized by dashed line 362, to control the position of the switch 356, symbolized by dashed line 364. The incoming data may emanate from or relate to processings previously carried out on (a) specific bird(s), such as a weighing process, on the basis of which the bird 352 has to be released at a specific point. The incoming data may also relate to processings which are to be carried out subsequently on the birds, such as cooling or carrying out presentation processing, for example dressing or trussing, carrying out an accurate visual (veterinary) inspection, or carrying out a boning operation at a relatively high temperature of the slaughter product.

Figure 14A:
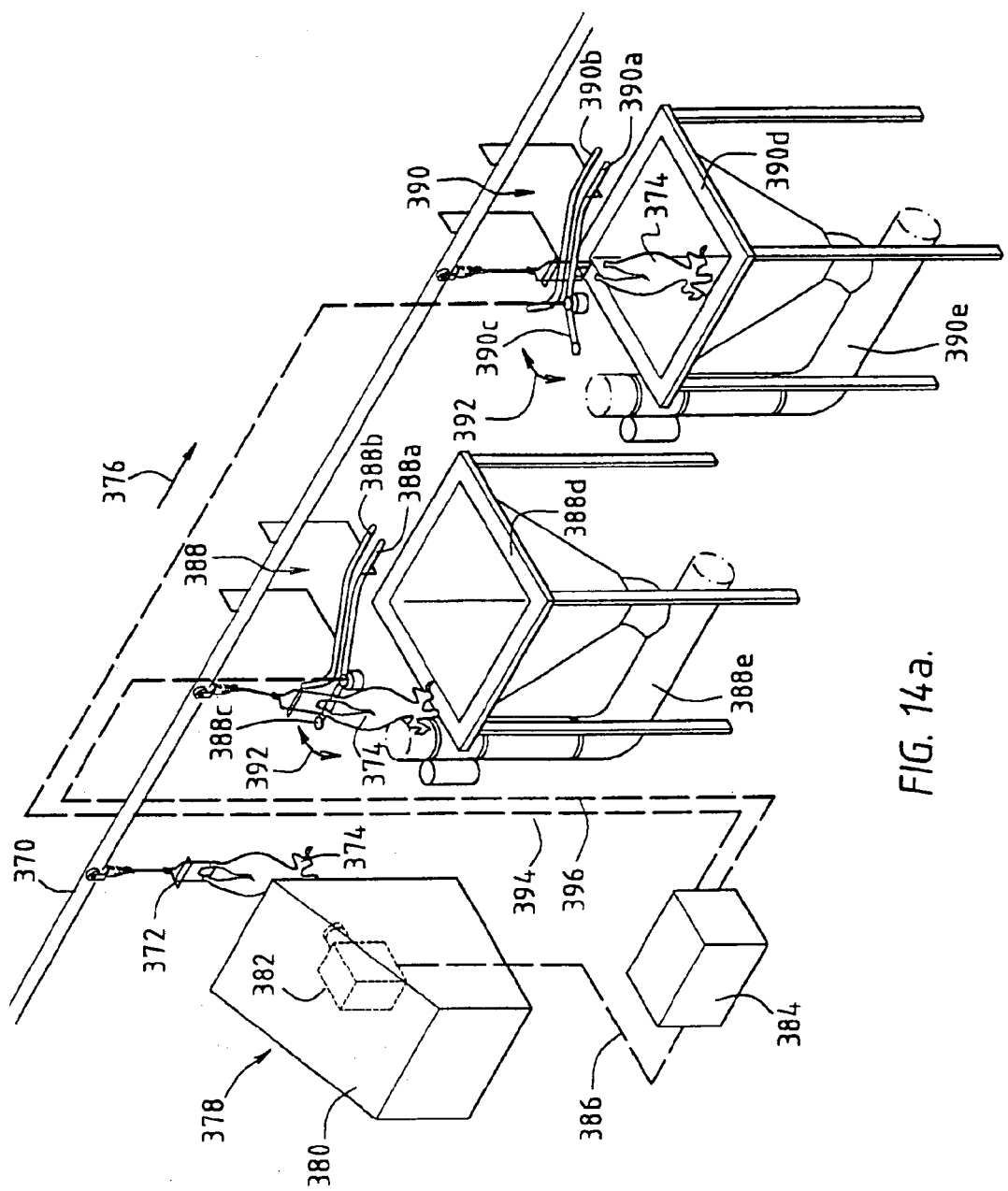
FIGS. 14a and 14b show diagrammatic, perspective views, partially in the form of a block diagram, of waste-removal devices.
Figure 14B:
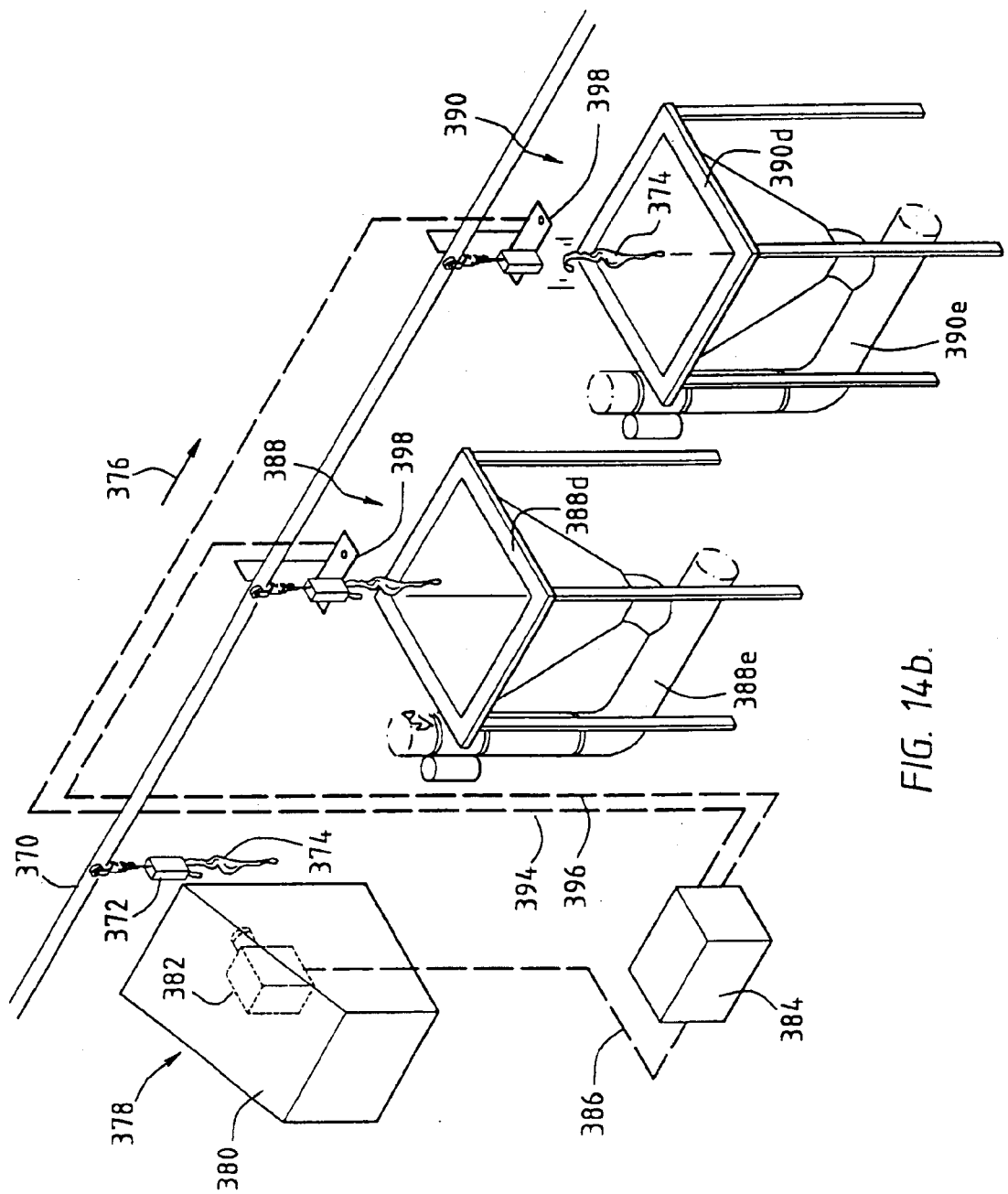

FIGS. 14a and 14b show a conveyor track 370, along which slaughter products 374 (in FIG. 14a carcasses of birds; in FIG. 14b viscera), which are hanging by their legs from hooks 372, are conveyed in the direction of arrow 376. In an image-recording station 378, a camera 382 is arranged inside a shield 380 in order to take a picture of the outside of the slaughter product 374 conveyed past it. The relevant image data are fed to a data-processing system 384, as symbolized by dashed line 386, and is processed in this system to form one or more control signals, as will be explained in more detail below.

As shown by FIG. 14a, two successive waste-removal devices 388, 390 are arranged downstream of the image-recording station 378. Each waste-removal device 388, 390 comprises a set of guides 388a, 388b and 390a, 390b, which run substantially parallel and upwards, as seen in the direction of the arrow 376. That end of the guides 388a and 390a which is located further upstream is provided with a pivot arm 388c and 390c, respectively, which can be pivoted about a pivot in a controllable manner, in the directions of the double arrow 392, with the aid of a drive (not shown in more detail). In the illustrated position of pivot arm 388c of the waste-removal device 388, a hook 372 in that area is guided on that side of the guide 388a which is remote from the guide 388b, and the hook 372, with a slaughter product 374 hanging from it, moves past the waste-removal device 388 without further ado. In the illustrated position of pivot arm 390c of the waste-removal device 390, in that area a hook 372 is guided on that side of the guide 390a which faces towards the guide 390b, with the result that the hook 372 moves between the guides 390a, 390b. The guides 390a, 390b, which run upwards at an angle, push the slaughter product 374 off the hook 372.

Beneath the guides 388a, 388b and 390a, 390b, there are respective collection receptacles 388d, 390d for collecting slaughter products 374 which have been pushed off a hook 372 into the waste-removal devices 388 and 390 and which are then removed through conveyor pipes 388e and 390e, respectively, by means of a vacuum in a manner which is known per se.

Assuming that the slaughter products 374 conveyed via conveyor track 370 are rejected slaughter products which, by means of the pictures taken using the camera 382 and, if appropriate, with the aid of additional methods, can be separated into rejected slaughter products with a low risk (for example a slaughter product which is too red or too small and which during further processing would fall off or could disrupt a processing, and which could be made into animal fodder) and rejected slaughter products with a high risk (which have to be sterilized, such as slaughter products from diseased animals), the rejected slaughter products with a low risk can be removed from the hook into the waste-removal device 388 and can be removed via the conveyor pipe 388e, while the rejected slaughter products with a high risk can be removed from the hook into the waste-removal device 390 and removed via the conveyor pipe 390e. For this purpose, the pivot position of the pivot arms 388c and 390c is selected in a suitable manner on the basis of said control signals generated by the data-processing system 384, as symbolized by dashed lines 394 and 396. In an alternative embodiment, the pivot position of the pivot arm 390c is permanent, as shown in FIG. 14a, with the result that a rejected slaughter product 374 with a low risk which inadvertently has not been removed from the hook 372 into the waste-removal device 388 is still removed from the hook 372 into the waste-removal device 390, which does not represent any drawback.

In FIG. 14b, the slaughter products 374 are viscera, for example of poultry, in which case the hooks 372 are provided with clamping devices for securely clamping part of the viscera and releasing the viscera in a controllable manner. To release a set of viscera from the hook 372, hook-actuating devices 398 are provided, which are arranged along the path of the hook 372 and above the collection receptacles 388d, 390d and can react to control signals generated by the data-processing system 384, as symbolized by the dashed lines 394 and 396, respectively.

The data-processing system 384, which may form part of said data-processing systems 12, 50, 82, 120, 132, 160, 230, 250, 280, 320 or 360, or may be coupled thereto, uses data emanating from the camera 382, symbolized by dashed line 386, to control the pivot position of the pivot arms 388c, 390c (FIG. 14a) or the hook-actuating devices 398 (FIG. 14b), symbolized by dashed lines 394 and 396, respectively. The incoming data may further emanate from or relate to processings previously carried out on (a) specific bird(s) or set(s) of viscera, such as a visual or veterinary inspection. The incoming data may also relate to processings which are subsequently to be carried out on the birds, such as dividing and/or boning slaughter products, with the result that the edible organs no longer have to be gathered.

It should also be noted that other embodiments of stations for removing rejected slaughter products and separating them into rejected slaughter products with a low risk and rejected slaughter products with a high risk are also possible. In this case, a conveyor track may be designed as a belt conveyor, on which the slaughter products are conveyed in a lying position. At the location of a waste-removal station, the slaughter product may be transferred from the belt conveyor into a collecting receptacle by pushing the slaughter product off the belt conveyor using a mechanical pusher component, blowing it off the belt conveyor using a compressed-air nozzle or blasting it off the belt conveyor using a liquid nozzle, in a direction which is transverse with respect to the longitudinal direction of the belt conveyor.

Figure 15:
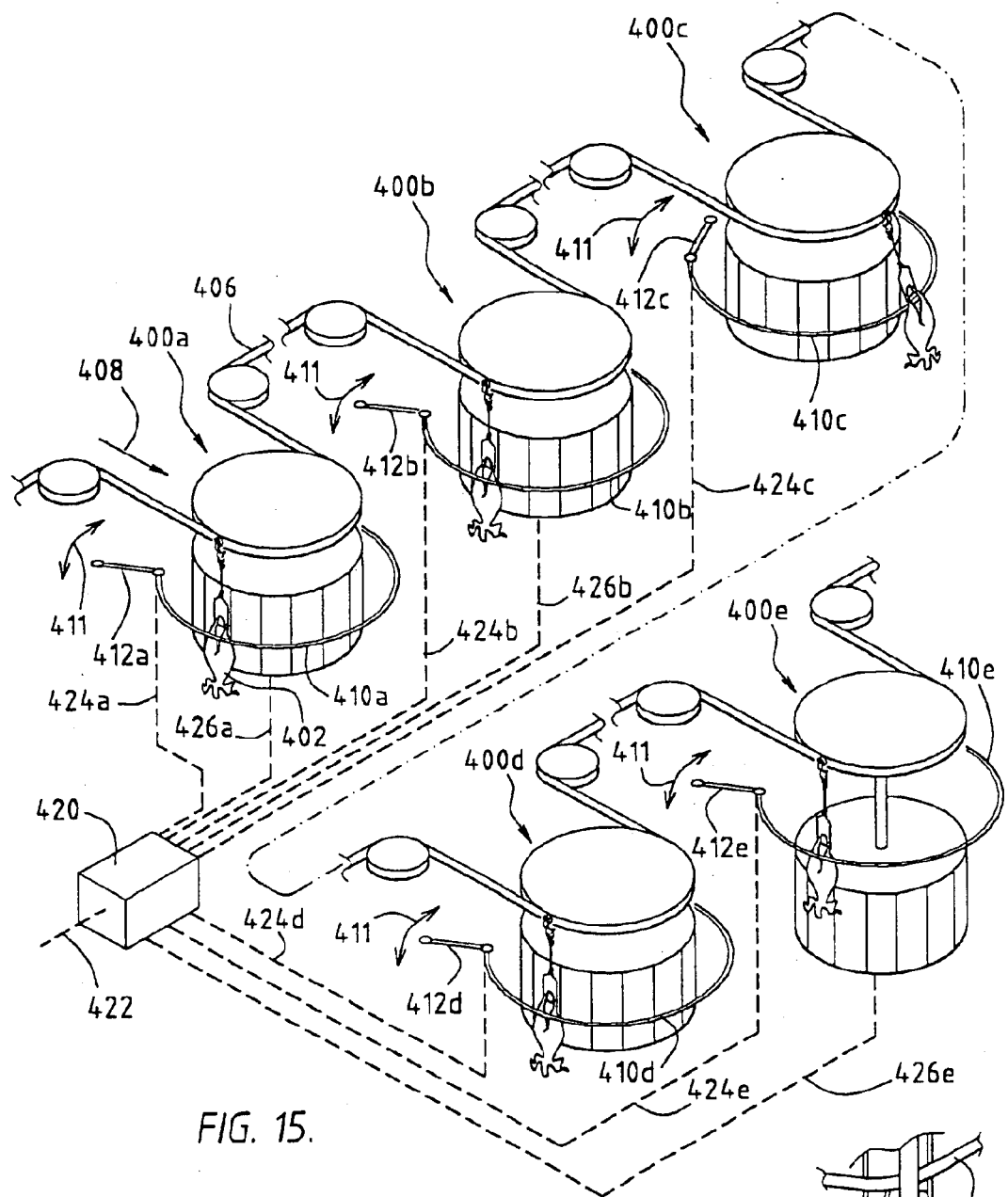
FIG. 15 shows a diagrammatic, perspective view, partially in the form of a block diagram, of a ready-to-cook line.

FIG. 15 shows a number of—in this case five—processing stations 400a, 400b, 400c, 400d and 400e, which form part, for example, of a so-called ready-to-cook line for poultry in a slaughter house. Each of the processing stations 400a–400e is of the carousel type and is able to carry out a different processing along their circumference on birds 402 which are guided past the processing stations 400a–400e via a conveyor track 406, hanging by their legs from hooks 404, in the direction of arrow 408. For the sake of clarity, birds 402 and hooks 404 are only shown at the locations of the processing stations 400a–400e; in actual fact, hooks 404 will, as is customary, be suspended at short distances apart. Along the circumference of each of the processing stations 400a–400e there is a respective guide 410a–410e, which is provided, at an end located furthest upstream, with a respective pivot arm 412a–412e which, with the aid of a drive (not shown in more detail), can be moved in a controllable manner into various pivot positions indicated by double arrow 411. The pivot arms 412a–412e make it possible for hooks 404, together with birds 402, which are supplied to the associated processing station 400a–400e, even on an individual level, if desired, to be moved to that side of the relevant guide 410a–410e which faces towards the processing station, with the result that the processing station carries out a processing on the bird, or to be moved to the opposite side of the guide 410a–410e, with the result that the bird moves past the processing station without being subjected to a processing therein, as desired. The latter option is important if the processing is unsuitable or undesirable for the bird(s) in question, or if the processing station in question is out of operation.

A data-processing system 420, which may form part of said data-processing systems 12, 50, 82, 120, 132, 160, 230, 250, 280, 320, 360 or 386, or may be coupled thereto, uses incoming data, symbolized by dashed line 422, to control the pivot position of the pivot arms 412a–412e, symbolized by respective dashed lines 424a–424e. The incoming data may emanate from or relate to processings previously carried out on (a) specific bird(s), such as subjecting them to a specific stunning processing, making a specific exsanguination incision, optionally removing the head or a part of the legs, or an inspection with the aid of an image-processing system in order to determine weight and quality. The incoming data may also relate to processings which are subsequently to be carried out on the birds, such as trussing or carrying out specific dividing or boning processings.

Figure 15A:
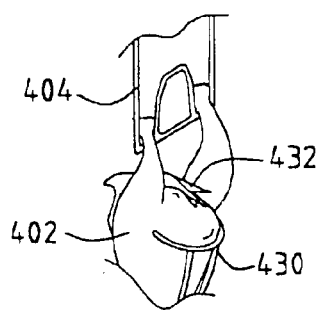
FIGS. 15a–15c show perspective views of details of processings which are carried out in the ready-to-cook line shown in FIG. 15.
Figure 15B:
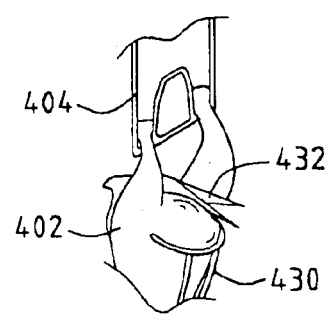

If it is assumed that the processing station 400a comprises an opening machine for making an opening incision in the abdominal skin of a bird 402, in which case the processing station 400a may make both an incision between the cloaca and the breast point and a transverse incision, a bird which is to be sold in the "traditional" style will be guided on the outside of the guide 410a by the data-processing system 420, with the aid of a suitable adjustment of the pivot arm 412a. By contrast, a bird 402 from which at least part of the viscera is to be removed will be guided on the inside of the guide 410a, in order for an opening incision to be made, for example an opening incision between the cloaca and the breast point. In this case, the opening machine in the processing station 400a may be adjusted by the data-processing system 420 in such a manner (symbolized by dashed line 426a) that the opening incision is short or long. FIG. 15a illustrates a first position of a bracket 430 with respect to the hook 404 in which a shears-like opening component 432 makes a short opening incision, which does not reach to the breast point of the bird 402, while FIG. 15b illustrates a second position of the bracket 430 with respect to the hook 404, in which the shears-like opening component 432 makes a long opening incision which extends to the breast point of the bird 402. The first and second positions of the bracket 430 can be adjusted for each slaughter product, in a manner not shown in more detail, under the control of the data-processing system 420. A short opening incision can be used if the slaughter product is to be presented as a whole product. A long opening incision can be used if a higher moisture uptake is desired during a subsequent cooling process, or if a simple skin-removal processing is desired during a subsequent boning processing.

One or both of the two opening machines may be provided with means, which can be controlled by the data-processing system 420, for optionally pricking holes in the abdominal skin. Holes of this nature lead to an increased moisture uptake in a subsequent cooling process and, secondly, make it possible to subsequently tie up the legs of the slaughter product by fitting the legs into the holes.

If it is assumed that the processing station 400b comprises a ready-to-cook preparation machine for drawing the viscera from a bird, a bird which is to be sold in the "traditional" style will be guided on the outside of the guide 410b by the data-processing system 420, with the aid of a suitable adjustment of the pivot arm 412b. By contrast, a bird which is subsequently to be divided will be guided on the inside of the guide 410b.

Figure 15C:
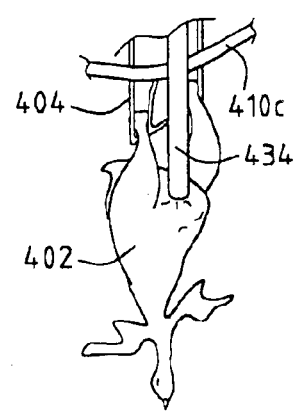

If it is assumed that the processing station 400c comprises a cloaca and intestine removal device, a bird which is to be sold in the "traditional" style will be guided on the inside of the guide 410c by the data-processing system 420 with the aid of a suitable adjustment of the pivot arm 412c. As illustrated by FIG. 15c, a cloaca cutter with intestine suction pipe 434 (not shown in more detail) is used to cut the cloaca out of the bird 402 and to suck the intestines, which are connected thereto out of the bird 402, preferably while ensuring that this is carried out in such a manner that the intestines break off in the vicinity of the stomach of the bird 402. Other birds, from which all the viscera have to be removed, have already been processed in the ready-to-cook preparation machine of processing station 400b and are guided to the outside of the guide 410c with the aid of the pivot arm 412c.

If it is assumed that processing station 400d comprises a fat-removal device for removing abdominal fat, a bird which is to be sold in the "traditional" style will be guided on the outside of the guide 410d by the data-processing system 420, with the aid of a suitable adjustment of the pivot arm 412d. The same applies to a bird which is to be sold at as high a weight as possible. By contrast, If the abdominal fat is to be removed from a bird, the corresponding hook 404, together with the bird 402, will be guided on the inside of the guide 410d.

If it is assumed that the processing station 400e comprises a neck-trimming-device, a bird 402 which is to be sold in the "traditional" style will be guided on the outside of the guide 410e by the data-processing system 420 with the aid of a suitable adjustment of the pivot arm 412e. By contrast, a bird 402 which is subsequently to be divided will be guided on the inside of the guide 410a, in which case the neck-trimming device can be adjusted by the data-processing system 420 in such a manner (symbolized by dashed line 426e) that the neck is trimmed to a short length. For birds 402 which are not subsequently divided, by selecting a different setting of the neck-trimming device using the data-processing system 420, the neck will have to be kept long enough to maximize the weight of the slaughter product and consequently the profit.

If it is assumed that a subsequent, similar processing station (not shown in more detail) to that shown in FIG. 15 comprises a crop-removal device for removing the crop, a bird 402 which is to be sold in the "traditional" style will be guided on the outside of a guide by the data-processing system 420 with the aid of a suitable adjustment of a pivot arm. By contrast, if a bird is to be sold with the crop removed, the bird is guided on the inside of the guide. In this case, the crop-removal device in the processing station may be adjusted by the data-processing system 420 in such a manner that fat and gland tissue remain behind in the neck skin or are removed, as desired. If fat and gland tissue remains, the final weight will be higher (and therefore the profit will be higher), and the moisture uptake during a subsequent cooling process will be increased.

Figure 16:
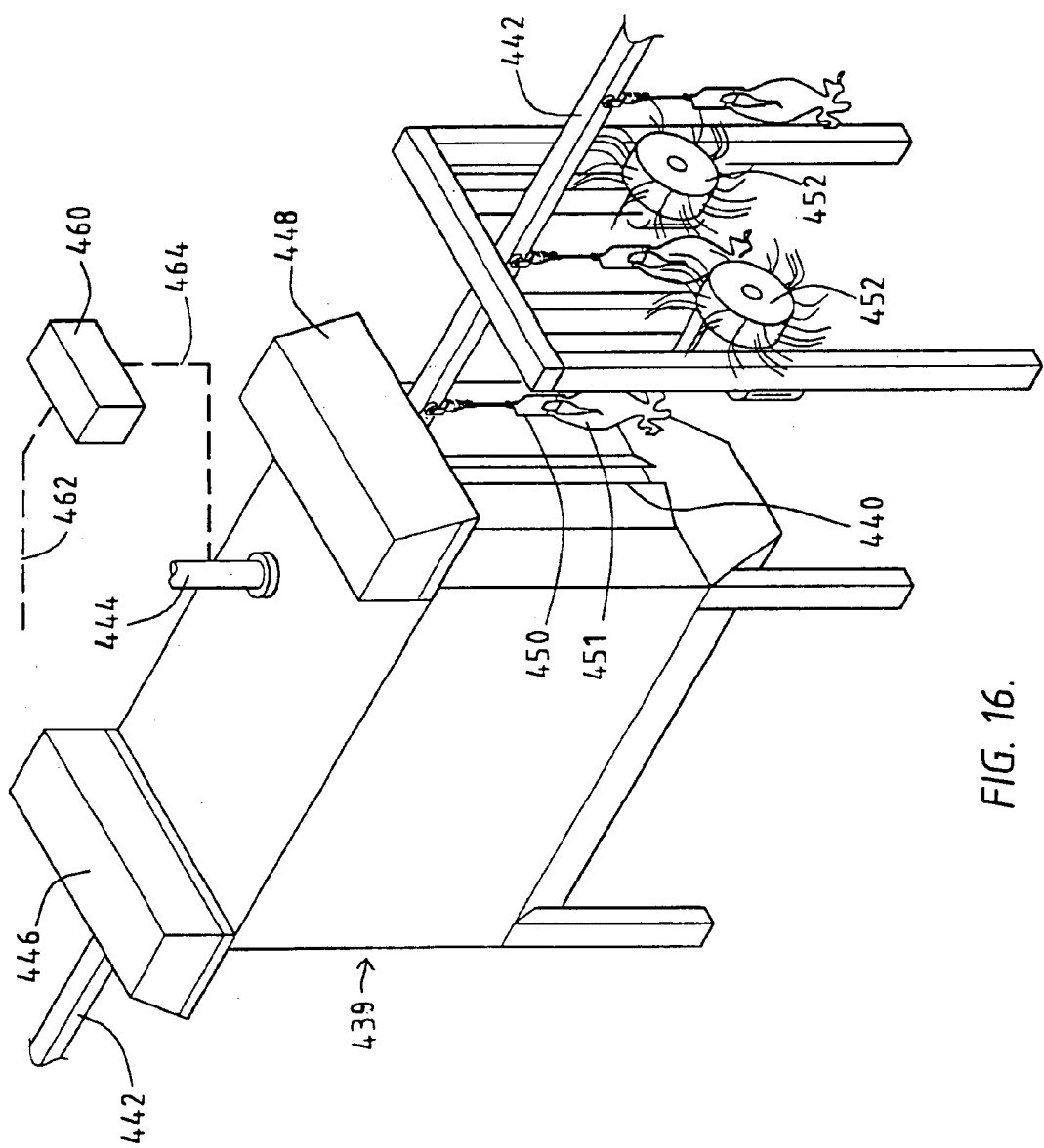
FIG. 16 shows a diagrammatic, perspective view, partially in the form of a block diagram, of a steam cabinet and epidermis removal device.

At the end of a ready-to-cook line, in which viscera are removed from slaughter animals, it is possible to arrange a steam or hot water cabinet, referred to below as steam cabinet 439 for short, as shown in FIG. 16. The steam cabinet comprises a chamber which is provided with a closable inlet opening (not visible in the figure) and outlet opening 440, is arranged in a conveyor track 442 and in which slaughter animals located in the chamber are brought into contact with steam or hot water which is supplied via a pipe 444 at a temperature to be selected and for a time to be selected. Vapour which escapes via the inlet opening and the outlet opening is sucked up under caps 446 and 448, respectively, and is returned to the closed chamber. The slaughter animals, which in FIG. 16 are birds 451 hanging by their legs from hooks 450 of the conveyor track 442, can be guided through the steam cabinet in order to subject the epidermis to a preprocessing for (possibly corrective) removal thereof, if this has not yet taken place, has taken place to an insufficient extent or has already partially taken place in an unforeseen manner in a prior processing. Two brushes 452, which can be driven in rotation and remove the feathers or epidermis pretreated in the steam cabinet from the bird, are arranged downstream of the steam cabinet, on either side of the path of the birds 451, so that in a subsequent cooling step the bird can be optimally cooled with water and specific cooking and coating properties of the skin are obtained. A passage through the steam cabinet may also be selected in order to decontaminate the surface of a slaughter product, for example if (faecal) contamination has taken place previously. In this case, the steam temperature and the duration for which the slaughter product remains in the steam cabinet can be determined on the basis of a measured product temperature.

A data-processing system 460, which may form part of said data-processing systems 12, 50, 82, 120, 132, 160, 230, 250, 280, 320, 360, 386 or 420, or may be coupled thereto, uses incoming data, symbolized by dashed line 462, to control the duration and the temperature of the steam which is supplied to the steam cabinet, symbolized by dashed line 464. The incoming data may be derived from or relate to processings previously carried out on (a) specific bird(s), such as a scalding process. The incoming data may also relate to processings which are to be carried out subsequently on the birds, such as a cooking or coating process.

In a cooling process in a meat-processing factory, the duration and profile of the internal temperature during cooling of a slaughter product has a considerable influence on the speed of hanging processes, so that the tenderness of the slaughter product can be controlled by suitably selecting the said duration and the said temperature profile. This requires the nature and temperature of the coolant which is to be brought into external contact with the slaughter product to be controlled, with the weight and the desired internal temperature of the slaughter product playing a role.

By way of example, a carcass of poultry which has been scalded at a high temperature in a previous scalding process requires cooling during a cooling process to be carried out in a moist environment, such as cooling by spraying water or by immersion in water. As another example, a slaughter product which can easily become bacteriologically infected requires a cooling process in which there is also a washing action, such as a cooling process carried out by a so-called spin cooler.

The cooling process of a slaughter product may, for example, be controlled on the basis of data concerning current or desired properties of the slaughter product, a measurement of the internal temperature of the slaughter product, a specific residence time of the slaughter product in the cooling process, or a detection of whether the surface of the slaughter product is dry.

The most suitable cooling process may be selected for each type of slaughter product: a so-called spin cooler for poultry which is scalded at high temperature, the aim being a high water uptake and intensive washing; spray cooling for poultry which has been scalded at high temperature; so-called infra-cooling for heavy slaughter products which have to be cooled quickly, or air cooling for poultry which has been scalded at a low temperature. Obviously, it is also possible for a slaughter product to be subjected to a combination of two or more of the cooling processes mentioned above, as desired. The time at which the cooling process begins can be selected on the basis of data relating to the hanging process of the slaughter product, as can be obtained, for examples by measuring the rigidity of the slaughter product, its colour or its pH. In addition, data of this nature may also be used to control the cooling process.

Figure 17:
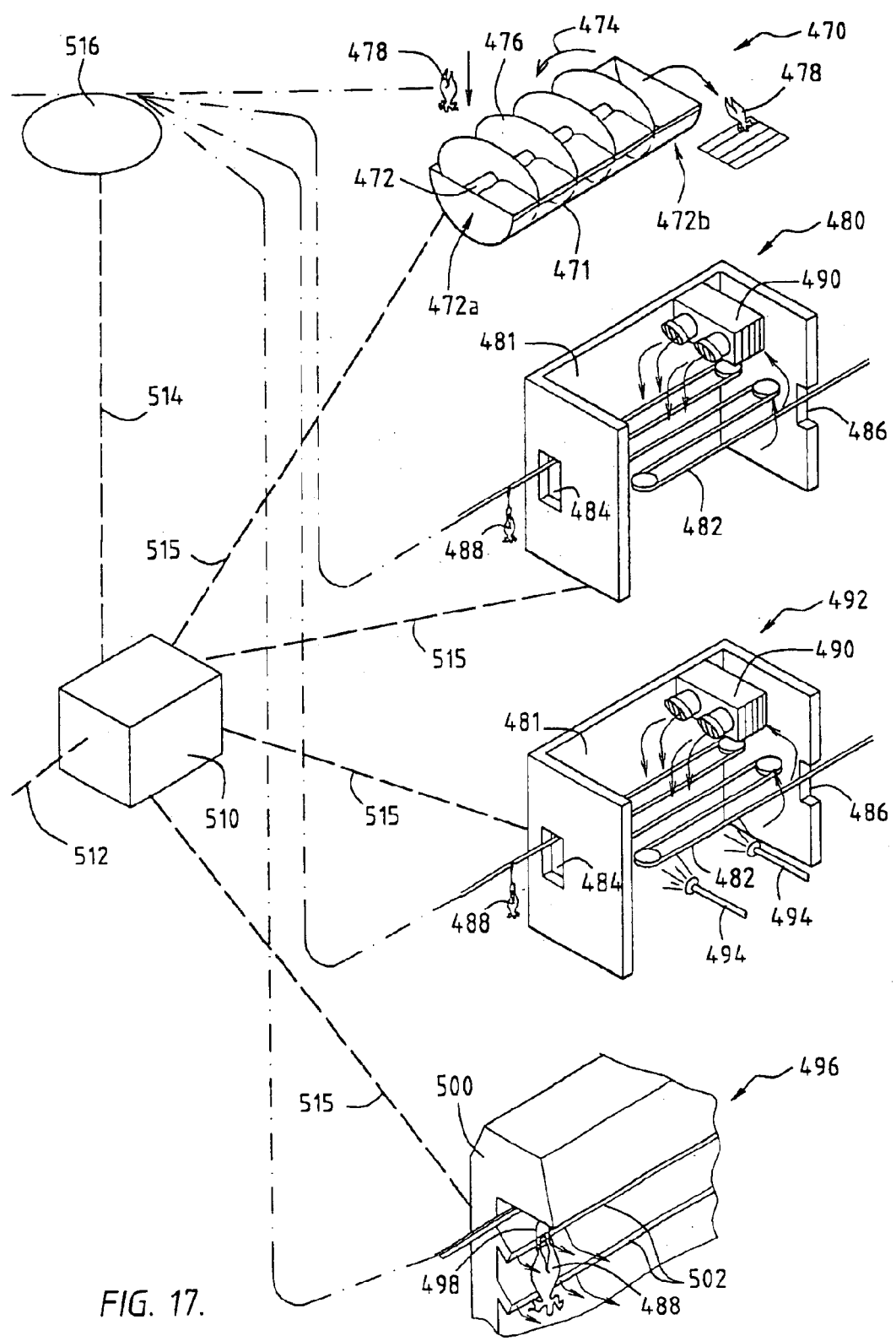
FIG. 17 shows a diagrammatic, perspective view, partially in the form of a block diagram, of various cooling arrangements.

For clarification purposes, FIG. 17 shows the various cooling arrangements discussed above. A first cooling arrangement 470 comprises a design of a water-bath cooling process, provided in the figure with a semicylindrical bath 471 which is filled with cold water and in which a worm 476, which can rotate about a shaft 472 in the direction of arrow 474, conveys carcasses of birds 478 from end 472a to end 472b. At the end 472b, the birds 478 are taken out of the bath 471 in a manner which is not shown in more detail. A second cooling arrangement 480 comprises a chamber 481 which is substantially enclosed by walls and through which a meandering conveyor track 482 runs, entering the chamber 481 at an inlet opening 484 and leaving it at an outlet opening 486. Birds 488 which are conveyed hanging from the conveyor track 482 are cooled in the chamber 481 by a so-called downflow air-cooling tunnel 490 which cools and circulates the air which is present in the chamber 481. A third cooling arrangement 492 substantially corresponds to the second cooling arrangement, with the exception of spraying devices 494 which are added to the third cooling arrangement 492 for spraying the birds 488 with a cooling liquid, such as water, with the result that the cooling effect of the air flowing past the birds 488 is intensified. In a fourth cooling arrangement 496, birds 488 which are hanging by their legs from hooks 498 are conveyed past a hollow cooling body 500 which is provided with gaps 502 out of which cooling air is forced, a process also known as infra-cooling.

A data-processing system 510, which may form part of said data-processing systems 12, 50, 82, 120, 132, 160, 230, 250, 280, 320, 360, 386, 420 or 460, or may be coupled thereto, uses incoming data, symbolized by dashed line 512, to control a transfer device 516, which is only illustrated diagrammatically, as symbolized by dashed line 514. In the transfer device 516, birds 488 which are supplied in a conveyor track 518 are transferred to one of four conveyor tracks 520, 522, 524 or 526, in order for each bird 488 to be subjected to the most suitable cooling process. The data-processing system 510 may also control the temperature in each of the cooling arrangements 470, 480, 492 and 496, as symbolized by dashed line 515. The incoming data may be derived from or relate to processings previously carried out on (a) specific bird(s), such as the time which has elapsed since death, a specific exsanguination incision, carrying out a scalding processing at a relatively low temperature or a relatively high temperature, recording of a weight of a slaughter product and/or recording of the quality of a slaughter product. The incoming data may also relate to processings which are to be carried out subsequently on the birds, such as the production of hard meat for sausage production, the production of fillet which is to be marinated and/or frozen, or carrying out a presentation processing, such as trussing.

FIG. 18 shows a section of a conveyor track 540 in an area of a meat-processing factory adjoining a cooling chamber. The conveyor track 540 conveys birds out of the cooling chamber via outlet opening 541, in the direction of arrow 543, and back into the cooling chamber via inlet opening 545. This temporary removal of the birds from the cooling process, with partial cooling taking place in the meantime, in order to obtain specific slaughter product properties, offers the possibility of, for example, tying up or trussing birds at a time at which they are still relatively easy to handle, instead of at the end of the cooling process, when the birds have become stiff. Hooks 542 which are provided with three recesses are moved along the conveyor track 540 in a manner not shown in more detail. FIG. 18 shows carcasses of birds 544a, 544b, 544c and 544d which are suspended in various ways. As shown in more detail by FIG. 18a, the bird 544a is hung by its head in the centre recess of a hook 542. As shown in more detail in FIG. 18b, the bird 544b is hung by its tail in the centre recess of a hook 542, with the wings tied up. As shown in more detail in FIG. 18c, the bird 544c is hung by its legs in the outer recesses of a hook 542. The bird 544d is also hung by its legs in the outer recesses of a hook 542, with the wings tied up.

A member of staff 546 prepares the birds on the basis of information which is provided on a screen 548 or, for example, via a loudspeaker with the aid of an (optionally computerized) speaking voice, such as a number of a hook 542 and the associated preparation, for a processing which is to be carried out subsequently. The way in which the birds are hung can also be used to indicate the processings to be carried out on the bird, not only in the situation shown but also during other processings. Under normal conditions, there will be less variation in the ways in which the birds are hung per number of successive hooks 542 than the situation shown in FIG. 18.

FIG. 19 shows a processing station in which carcasses of birds 550 which have been selectively removed from a cooling process are fed along a sliding surface 552, via an outlet opening 541 from a cooling chamber, to a receptacle 554. A member of staff 556 takes the birds 550 supplied out of the receptacle 554 and ties the legs and wings together on a workbench 558. After the legs and the wings have been tied up, the member of staff 556 places the bird 550 on a belt conveyor 560, by means of which the bird 550 is returned to the cooling chamber via inlet opening 545, in the direction of arrow 562. The processing station is placed at such a position in the slaughter-product processing that the processing to be carried out is still possible. In the present case, the birds have not yet become completely rigid as a result of previous cooling, so that it is still possible to tie up the wings and legs.

Figure 20:
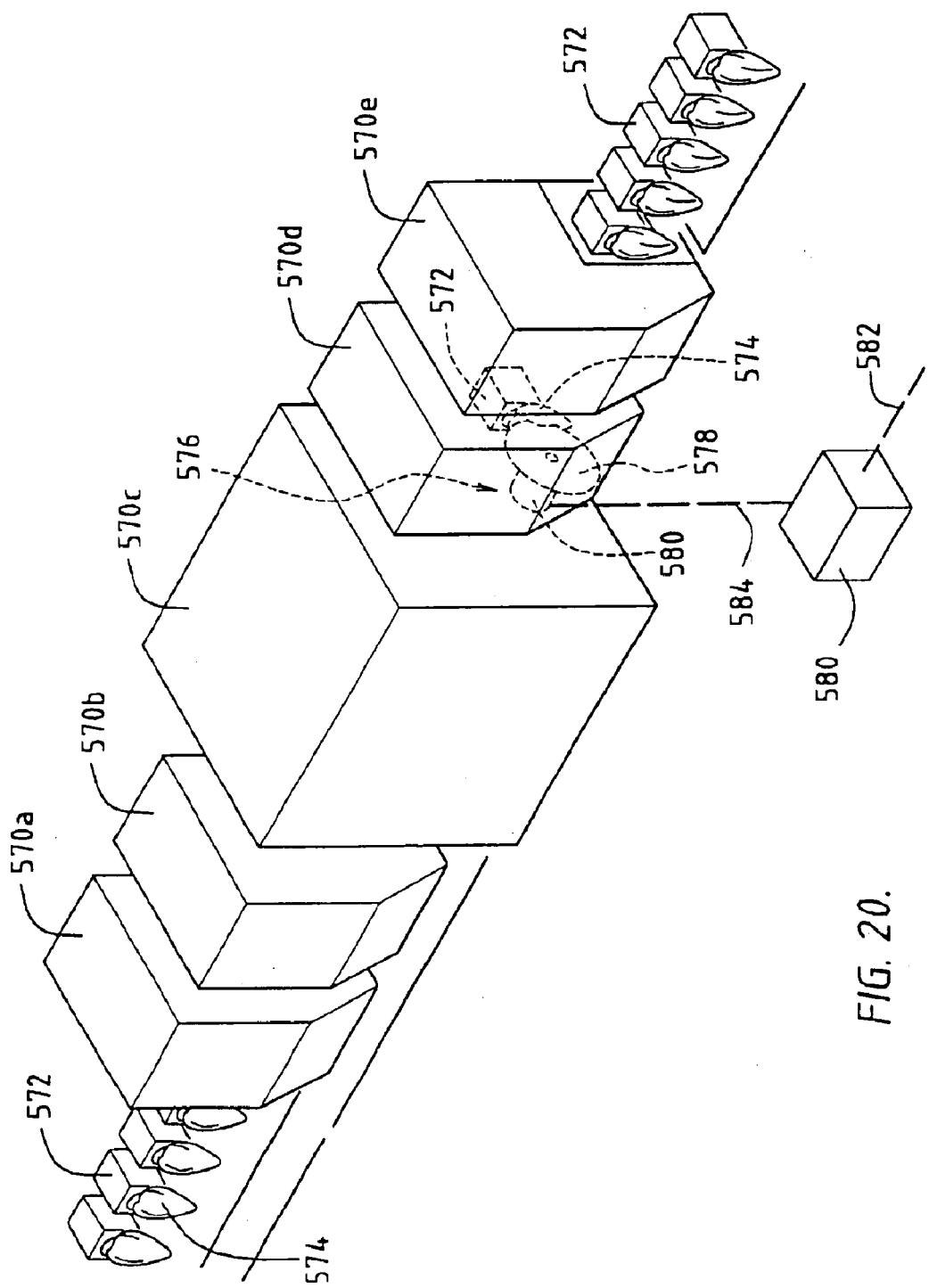
FIG. 20 shows a diagrammatic, perspective view, partially in the form of a block diagram, of a filleting device.

FIG. 20 shows a filleting device, comprising five processing stations 570a, 570b, 570c, 570d and 570e. Breast pieces 574 of poultry, which are attached to holders 572, are conveyed through the processing stations 570a–570e, with the ridge of the breastbone of each breast portion being directed vertically at least in the processing station 570d. In the processing station 570d, there is a cutting device 576 which can be moved into the path of the breast portions in a manner which can be controlled and is not shown in more detail, and comprises a single or double circular blade 578, which under the control of a motor 580 is driven in a desired direction and at a desired speed. The cutting device 576 can be used to cut selectively into the breast fillet of each breast portion 574 in the vicinity of the ridge of the breast bone. It is thus possible to obtain one complete fillet or two half fillets as desired, by moving the cutting device out of or into the path of the relevant breast portion as desired.

A data-processing system 580, which may form part of said data-processing systems 12, 50, 82, 120, 132, 160, 230, 250, 280, 320, 360, 386, 420, 460 or 510, or may be coupled thereto, uses incoming data, symbolized by dashed line 582, to control the position, the driven direction and the driven speed of the cutting device 576, as symbolized by dashed line 584. The incoming data may emanate from or relate to processings previously carried out on (a) specific bird(s), such as a specific stunning, scalding or plucking processing, a specific cooling regime, carrying out a weight and/or quality measurement, or carrying out a skin-removal processing. The incoming data may also relate to processings which are to be carried out subsequently on the birds, such as carrying out a specific packaging processing (for example on the abdomen on a dish), or a further processing such as marinating, cooking, frying or individual rapid freezing.

Figure 21:
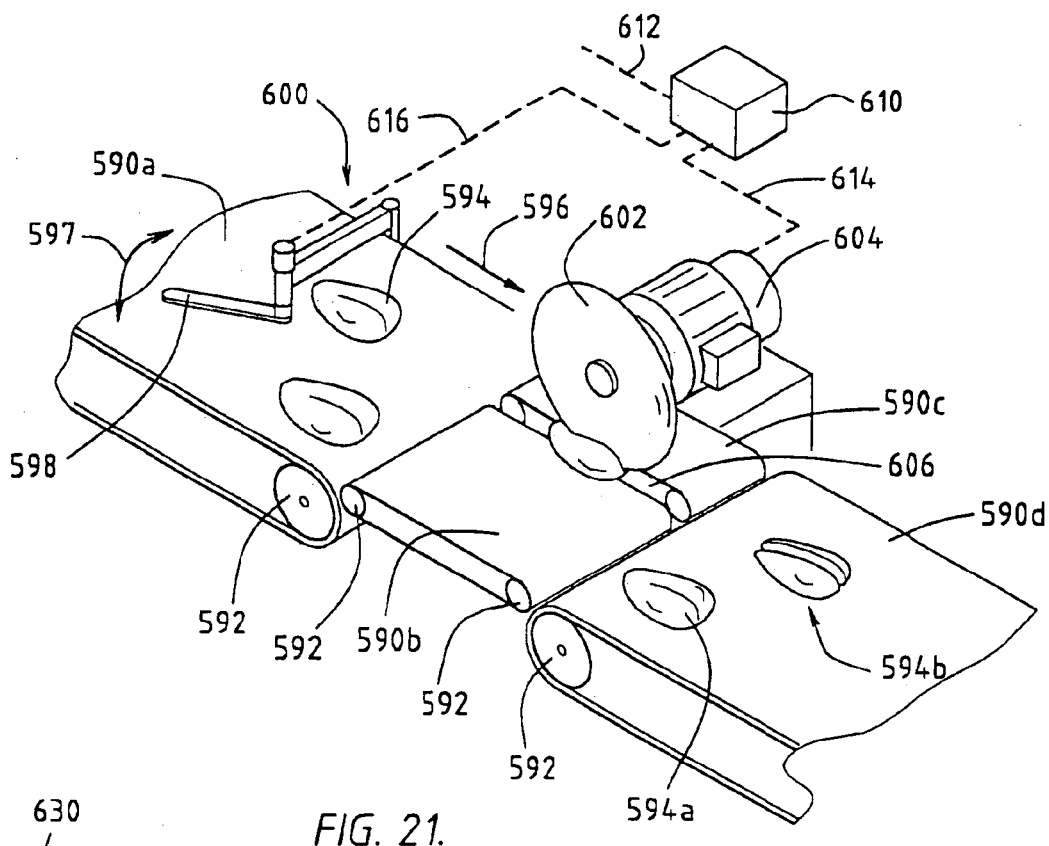
FIG. 21 shows a diagrammatic, perspective view, partially in the form of a block diagram, of a dividing device.

FIG. 21 shows four conveyor belts 590a, 590b, 590c and 590d which adjoin one another, are mounted on rollers 592 and are all driven in such a manner (not shown in more detail) that slaughter products lying on the conveyor belts 590a–590d, in this case breast fillets 594 of poultry, are conveyed in the direction of arrow 596. The speed of each of the conveyor belts 590a and 590d may differ from that of the conveyor belts 590b and 590c, which are moving at the same speed. A breast fillet 594 which is supplied substantially along the longitudinal centre axis of the conveyor belt 590a is displaced laterally over the conveyor belt 590a by a pivot arm 598 of a stationary pivot device 600 which can be pivoted in the directions of double arrow 597 by a drive (not shown in more detail), the direction of displacement being dependent on the pivot position of the pivot arm 598. The breast fillets 594 which have thus been moved into position are then transferred to the conveyor belt 590d (breast fillet 594a) without further processing from the conveyor belt 590b or are halved during the transfer (breast fillet 594b). The halving is carried out by means of a stationary rotating blade 602 which is driven in a choosable direction of rotation and at a choosable rotational speed by a motor 604 and acts at the location of a gap 606 between the conveyor belts 590b and 590c.

A data-processing system 610, which may form part of said data-processing systems 12, 50, 82, 120, 132, 160, 230, 250, 280, 320, 360, 386, 420, 460, 510 or 580, or may be coupled thereto, uses incoming data, symbolized by dashed line 612, to control the position, the driven direction and the driven speed of the blade 602, as symbolized by dashed line 614, and the pivot position of the pivot arm 598, as symbolized by dashed line 616. The incoming data may emanate from or relate to processings previously carried out on (a) specific bird(s), such as carrying out a specific stunning, scalding or plucking processing, a specific cooling regime, carrying out a weight and/or quality measurement, or optionally carrying out a skin-removal processing. The incoming data may also relate to processings which are to be carried out subsequently on the birds, such as carrying out a specific packaging processing (for example on the abdomen on a dish), or a further processing, such as marinating, cooking, frying or individual rapid freezing.

Figure 22:
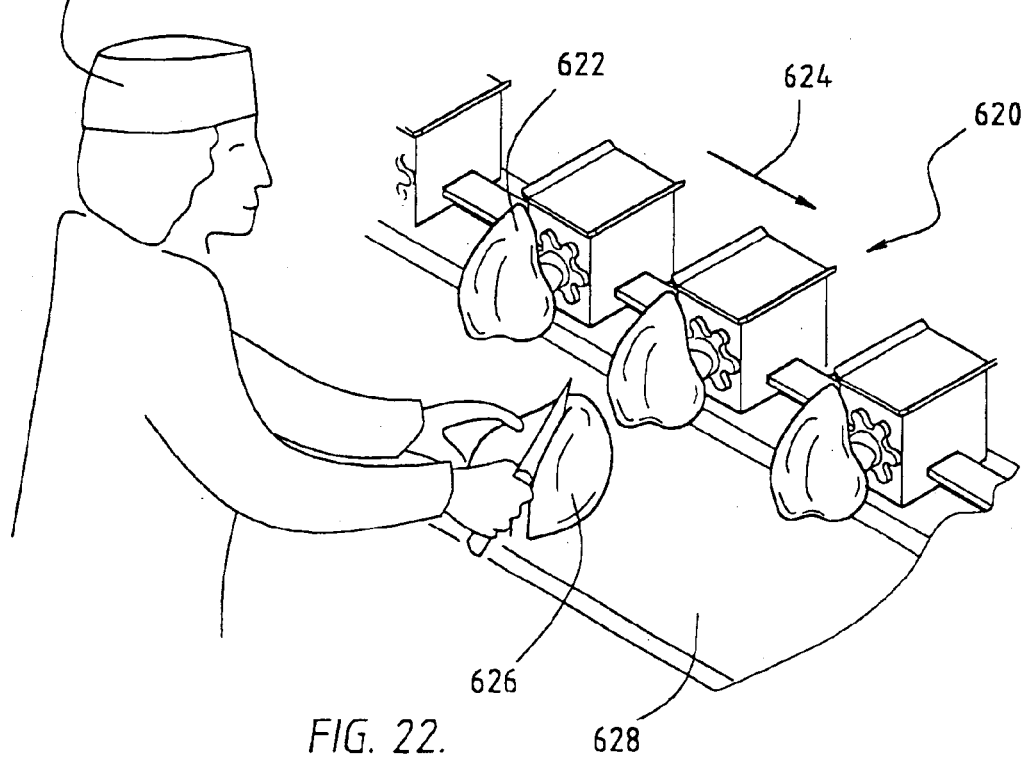
FIG. 22 shows a diagrammatic, perspective view of a processing station for dividing a fillet.

FIG. 22 shows a section of a filleting line 620, along which slaughter pieces which are attached to holders, in this case breast portions 622 of poultry, are moved along in the direction of arrow 624. Breast fillets 626 are removed manually from the breast portions 622 and are conveyed past a member of staff 630 on a conveyor belt 628 in the direction of the arrow 624. On the basis of the colour of the breast fillet 626, the member of staff 630 decides whether or not this fillet should be halved, and in the event of a positive decision carries out the processing using a blade 632.

In the following text, further aspects of dividing processes according to the invention carried out in a meat-processing factory will be discussed without reference to the drawing.

Generally, previously gathered historical and process data will be used to ensure that the (dividing) processings proceed optimally, so that the added value is increased or maximized. In this case, cutting or gathering pieces of meat may, for example, take place on the basis of the quality of pieces, which can be established, for example, by determining the colour using an image-processing system. The cutting or gathering of pieces of meat may also take place on the basis of the suitability of pieces for a specific subsequent processing, which can be established, for example, by the presence/absence of skin or detecting the colour using an image-processing system, by detecting the uptake or loss of moisture using a suitable sensor or predicting this uptake or loss of moisture by means of a conductivity measurement using a suitable sensor, or by measuring the pH using a suitable sensor.

The location at which a cut is made can be selected according to the destination of the slaughter product which is to be cut or gathered. For example, for some destinations it is important to obtain slaughter products of a specific weight or a specific length, in which case the cutting point can be determined with the aid of an image-processing system. By way of example, for a leg it may be appropriate for the associated hip joint to be partially cut off, in connection with the attachment of one or more tendons of leg muscles in the vicinity of the hip joint, if the leg is to be boned, instead of making an anatomical incision if the leg or parts thereof are to be sold as slaughter products with bone. A leg which is broken, a fact which can be established, for example, using an image-processing system, is not fed to a normal boning device, but rather is guided to a processing station where manual boning takes place, or is guided to a packaging department for releasing the leg as a bone-containing slaughter product.

Slaughter products with external shortcomings (for example blood traces or breast blisters), which can be detected using an image-processing system, are boned or filleted according to the location of the shortcomings.

A residual flow of various slaughter products which are intended to be mixed and/or minced, is assembled on the basis of the percentages of the various slaughter products and their properties in the residual flow. A measurement of the properties of the residual flow controls the percentage fractions of the various slaughter products on the basis of historical data and/or data previously obtained during a processing concerning the composition of the slaughter products.

FIG. 23 shows an oven 640 which can be heated internally in a manner not shown in more detail. Slaughter products 642, such as breaded fillets of various shapes, are supplied to the oven 640 in the direction of arrow 644, via an inlet opening which cannot be seen in the figure, by means of a belt conveyor 646. Three further belt conveyors 648a, 648b and 648c are arranged in the oven 640, by means of which further belt conveyors the slaughter products 642 are conveyed to and fro in the horizontal direction, and from the top downwards through the oven 640, the slaughter products 642 at the end of one conveyor belt falling onto a subsequent conveyor belt. Finally, the slaughter products 642 are removed from the oven 640 in the direction of arrow 650, via an outlet opening 652, by means of a belt conveyor 654. As shown in more detail in FIG. 23a, the belt conveyor 648b and a roller 656 thereof are air-permeable. A pipe 660 which is provided with compressed-air outlet openings 658 is arranged inside the roller 656. It is thus possible for slaughter products 642 to be blown off the belt conveyor 648b by causing compressed air to flow out of the compressed-air outlet openings 658, these products moving onto a belt conveyor 662 which removes the slaughter products 642 from the oven 640 via an outlet opening 664, in the direction of arrow 666. By controlling the flow of compressed air on the basis of data which emanate from a camera, which is not shown in more detail and is arranged in the oven 640 above the belt conveyor 648b, of an image-processing system, it is possible, for example, to transfer slaughter products of a specific shape, which are cooked earlier than the other slaughter products situated in the oven, onto the belt conveyor 662 by briefly feeding compressed air to the pipe 660 at the moment at which the slaughter product 642 which is to be transferred is situated at the location of a compressed-air outlet opening 658. For the same purpose, it is also possible, for example, to measure the temperature of the slaughter products before or at a compressed-air outlet opening 658, with the aid of a sensor which is sensitive to infrared radiation.

A data-processing system 670, which may form part of said data-processing systems 12, 50, 82, 120, 132, 160, 230,

250, 280, 320, 360, 386, 420, 460, 510, 580 or 610, or may be coupled thereto, uses incoming data, symbolized by dashed line 672, to control the temperature of the oven 640, as symbolized by dash line 674. The incoming data may emanate from or relate to processings previously carried out, such as applying a specific crumb coating to certain slaughter products or making a slaughter product of a specific thickness, shape or composition. The incoming data may also relate to processings which are to be carried out subsequently on the slaughter products, such as a cooling process or packaging processings.

FIG. 24 shows an oven 680, through which a conveyor belt 684, on which slaughter products 686 are being conveyed, runs in the direction of arrow 682. An infrared camera 688 which is arranged in a stationary position above the conveyor belt 684 records the position and the temperature of the slaughter products 686 moving past and feeds this information to a data-processing system 690, as symbolized by dashed line 692. The data-processing system 690, which may form part of said data-processing system 12, 50, 82, 120, 132, 160, 230, 250, 280, 320, 360, 386, 420, 460, 510, 580, 610 or 670, or may be coupled thereto, uses the position and the temperature of the slaughter products 686 to control the speed of the conveyor belt 684 and other incoming data, symbolized by dashed line 694, to control the positioning of an arm 698 which can be displaced in the directions of double arrow 696 and at one end bears a head 700 which can be used to spray a selected small or excessively hot slaughter product 686 with cold carbon dioxide gas, so that the cooking process in the oven 680 proceeds optimally for each slaughter product 686. Data concerning excessively hot slaughter products 686 can be fed back to upstream processings, as symbolized by dashed line 702, in order for measures to be taken in these processes which lead to the temperature of the relevant slaughter products 686 at the location of the infrared camera 688 falling on a long-term basis and more closely approaching the desired value.

Figure 25:
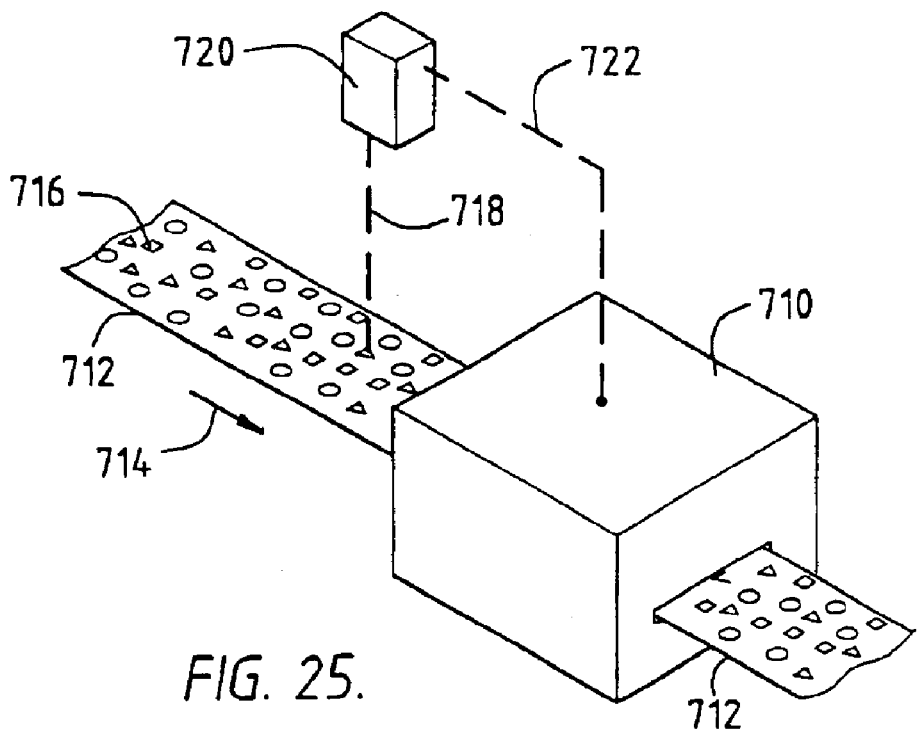
Figure 26:
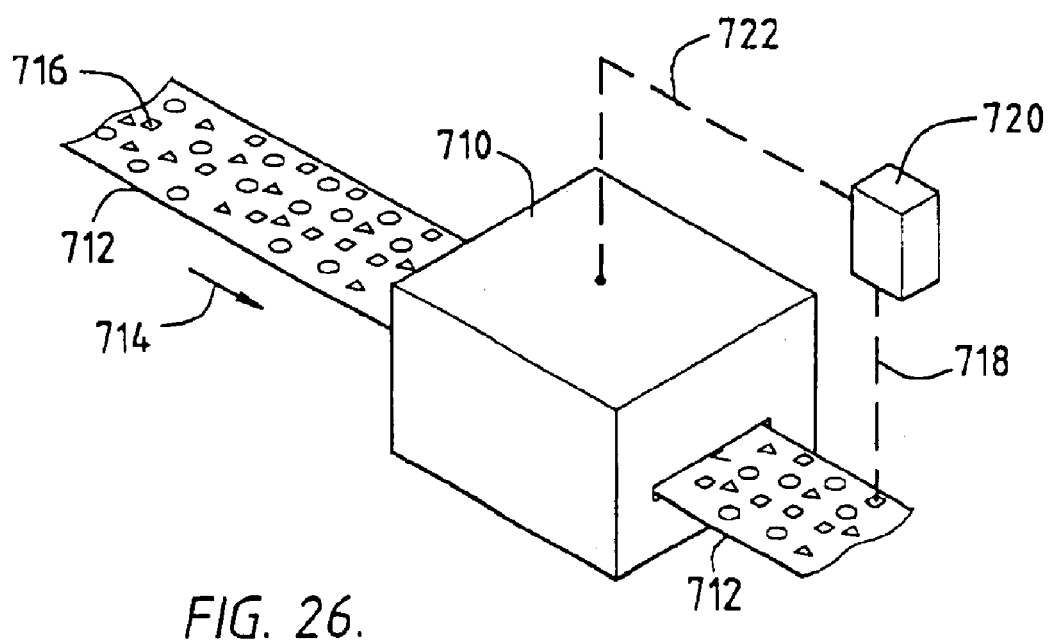

FIGS. 25 and 26 show an oven 710, through which slaughter products 716 are conveyed in the direction of arrow 714, with the aid of a conveyor belt 712.

As illustrated by dashed line 718, the temperature and/or the weight of the slaughter products 716 may be determined before (FIG. 25) or after (FIG. 26) they have passed through the oven 710, and a data-processing system 720 can use this information to adjust one or more parameters, such as the temperature or the residence time, of the processing in the oven 710, as symbolized by dashed line 722. The data-processing system 720 may form part of said data-processing systems 12, 50, 82, 120, 132, 160, 230, 250, 280, 320, 360, 386, 420, 460, 510, 580, 610, 670 or 690, or may be coupled thereto.

It should also be noted that the selection of a specific routing in one or more processings by controlling switches and/or pivot arms and/or bypass conveyor tracks and/or selective transfer devices as shown in FIGS. 3, 4a, 6–11, 13a–13f, 14a, 14b, 15, 17, 21 and 23 may also take place in processings other than those shown.

Finally, an example of a method according to the invention is also given, in order to provide further illustration of this method.

When processing birds to produce "traditional" slaughter products in order to supply a specified number of such slaughter products, it is disadvantageous for all the birds to follow the same processings, since this will produce waste because not all the birds satisfy the quality demands which are to be imposed. In the method according to the invention, after the required number of birds of a specific quality has been exanguinated, as established by counting, it is possible to switch over to other slaughter products, but if unacceptable loss of quality (such as broken wings) may still occur after exsanguination, it is possible to switch over to different slaughter products only when the required number of birds has reached a head-scalding station, for example. If it should be determined here that an excessive number of birds has undergone preliminary processing for "traditional" purposes, or if quality defects should later come to light, making the birds unsuitable for use as a "traditional" slaughter product, the surplus or unsuitable birds can be processed into other slaughter products. The added value is then higher than the added value in the case of surplus or defective "traditional" slaughter products, which have to be sold at a discount.

While the invention has been described and illustrated in its preferred embodiments, it should be understood that departures may be made therefrom within the scope of the invention, which is not limited to the details disclosed herein.

What is claimed is:

1. A method for processing slaughter products comprising:
   providing at least one processing station for performing at least one processing on the slaughter products, wherein at least one parameter of the processing is adjustable;
   recording property data relating to at least one property of each of the slaughter products;
   recording relationship data relating to at least one relationship between parameter data relating to the at least one parameter of the processing and the property data;
   recording demand data relating to at least one desired property of the slaughter products;
   recording processing data about the processing of each of the slaughter products; and
   controlling the processing of a current slaughter product by adjusting the at least one parameter of the processing on the basis of information comprising:
   i) the property data of at least the current product,
   ii) the relationship data,
   iii) the demand data, and
   iv) the processing data of other slaughter products.

2. The method of claim 1, further comprising:
   recording data that indicates the availability of the at least one processing station.

3. The method of claim 1, further comprising:
   recording data that indicates the availability of the slaughter product.

4. The method of claim 1, further comprising:
   recording data that indicates the availability of at least one staff member at the at least one processing station.

5. The method of claim 1, further comprising:
   controlling the processing of the slaughter product by selecting a routing for the processing of the slaughter product on the basis of at least part of the property data, the relationship data, and the demand data.

6. A device for processing slaughter products comprising:
   at least one processing station for performing at least one processing on the slaughter products, wherein at least one parameter of the processing is adjustable;
   slaughter product property recording means for recording property data relating to at least one property of each of the slaughter products;
   relationship recording means for recording relationship data relating to at least one relationship between parameter data relating to the at least one parameter of the processing and the property data;

demand recording means for recording demand data relating to at least one desired property of the slaughter products;

processing recording means for recording processing data about the processing of each of the slaughter products; and processing parameter adjustment means for controlling the processing of a current slaughter product by adjusting the at least one parameter of the processing on the basis of information comprising:
i) the property data of at least the current product,
ii) the relationship data,
iii) the demand data, and
iv) the processing data of other slaughter products.

7. The device of claim 6, further comprising:
processing station availability recording means for recording data that indicates the availability of the at least one processing station.

8. The device of claim 6, further comprising:
slaughter product availability recording means for recording data that indicates the availability of the slaughter product.

9. The device of claim 6, further comprising:
staff recording means for recording data that indicates the availability of at least one staff member at the at least one processing station.

10. The device of claim 6, further comprising:
routing selection means for controlling the processing of the slaughter product by selecting a routing for processing the slaughter product on the basis of at least part of the property data, the relationship data, and the demand data.

11. The device of claim 6, wherein the slaughter product property recording means comprise:
a data input means for inputting data relating to the slaughter product; and
a data-processing system connected to the data input means.

12. The device of claim 6, wherein the slaughter product property recording means comprises:
first weighing means for weighing the slaughter product prior to a processing;
second weighing means for weighing the slaughter product after the processing; and
a data-processing system for recording weight data determined by the first and second weighing means.

13. The device of claim 6, wherein the processing station is a stunning station comprising:
a stunning device for stunning the slaughter product, wherein the processing parameter adjustment means is adapted to adjust a parameter of a stunning process carried out by the stunning device; and
a data-processing system for controlling the processing parameter adjustment means.

14. The device of claim 6, wherein the processing station is an exsanguination station comprising:
at least one blood vessel opening device comprising a working area for opening at least one blood vessel of the slaughter product, wherein the processing parameter adjustment means is adapted to move the slaughter product into and out of the working area of the blood vessel opening device; and a data-processing system for controlling the processing parameter adjustment means.

15. The device of claim 14, further comprising a stunning station for the slaughter product, wherein the stunning station is located downstream of the exsanguination station.

16. The device of claim 6, wherein the processing station is a scalding station comprising:
a scalding device comprising at least a first and a second reservoir, wherein the first and second reservoirs contain liquid and wherein the temperature of the liquid of the first reservoir is different than the temperature of the liquid of the second reservoir, wherein the processing parameter adjustment means is adapted to move the slaughter product through at least one of the first reservoir and the second reservoir; and
a data-processing system for controlling the processing parameter adjustment means.

17. The device of claim 6, wherein the processing station is a scalding station comprising:
a scalding device with at least one reservoir containing a scalding liquid having at least one scalding parameter, wherein the processing parameter adjustment means is adapted to adjust the at least one scalding parameter; and
a data-processing system for controlling the processing parameter adjustment means.

18. The device of claim 17, wherein the at least one scalding parameter is scalding temperature.

19. The device of claim 17, wherein the at least one scalding parameter is scalding time.

20. The device of claim 6, wherein the processing station is a scalding station comprising:
a scalding device with at least one reservoir containing a scalding liquid, wherein the processing parameter adjustment means is adapted to move at least a head of the slaughter product into and out of the reservoir of the scalding device; and
a data-processing system for controlling the processing parameter adjustment means.

21. The device of claim 6, wherein the processing station is a massage station comprising:
at least one massage device to act mechanically on the slaughter product in a working area of the massage device, wherein the processing parameter adjustment means is adapted to move the slaughter product into and out of the working area of the at least one massage device; and
a data-processing system for controlling the processing parameter adjustment means.

22. The device of claim 6, wherein the processing station is a buffer station comprising:
conveyor means for conveying slaughter products through the buffer station;
a buffer device to buffer at least some of the slaughter products, wherein the processing parameter adjustment means is adapted to selectively remove selected slaughter products from the conveyor means, buffer the selected slaughter products with the buffer device, and transfer the selected slaughter products from the buffer device to the conveyor means; and
a data-processing system for controlling the processing parameter adjustment means.

23. The device of claim 6, wherein the processing station is a head-pulling station comprising:
a head-pulling device for removing a head of the slaughter product in a working area of the head-pulling device, wherein the processing parameter adjustment means is adapted to move the slaughter product into and out of the working area of the head-pulling device; and a data-processing system for controlling the processing parameter adjustment means.

24. The device of claim 6, wherein the processing station is a cutting station comprising:

at least one cutting unit which is adapted to make a cut in the slaughter product in a working area of the cutting unit, wherein the processing parameter adjustment means is adapted to displace the at least one cutting unit to move the slaughter product into and out of the working area of the at least one cutting unit; and a data-processing system for controlling the processing parameter adjustment means.

25. The device of claim 6, wherein the processing station comprises a processing tool engaged with a roller, wherein the roller engages a control groove in a wall and wherein the device further comprises:

drive means for displacing the wall and the roller with respect to one another, wherein the control groove is bifurcated into at least two secondary grooves and wherein the control groove at the location of the bifurcation comprises an adjustable switch mechanism with at least two positions for guiding the roller into one of the at least two secondary grooves, wherein the processing parameter adjustment means is adapted to adjust the switch mechanism into one of the at least two positions; and a data-processing system for controlling the processing parameter adjustment means.

26. The device of claim 6, wherein the processing station is a waste-removal station comprising:

at least one waste-removal device for removing a waste slaughter product in a working area of the waste-removal station, wherein the processing parameter adjustment means is adapted to move the waste slaughter product into or out of the working area of the waste-removal device; and a data-processing system for controlling the processing parameter adjustment means.

27. The device of claim 6, wherein the at least one processing station comprises a number of processing stations each having a working area, wherein the processing parameter adjustment means is adapted to selectively move the slaughter product into and out of the respective working areas of the processing stations on the basis of data recorded upstream with respect to the slaughter product; and a data-processing system for controlling the processing parameter adjustment means.

28. The device of claim 6, wherein the processing station is a correction station comprising:

a correction device which is adapted to correct a processing which has previously been carried out on the slaughter product; and a data-processing system for controlling the processing parameter adjustment means.

29. The device of claim 6, wherein the processing station is a cooling station comprising:

a number of cooling devices which are adapted to cool the slaughter product;

a transfer device for transferring the slaughter product to at least one of the cooling devices, wherein the slaughter product comprises a product property and wherein the processing parameter adjustment means is adapted to transfer the slaughter product into the transfer device based on the product property; and a data-processing system for controlling the processing parameter adjustment means.

30. The device of claim 6, wherein the slaughter product property recording means is adapted to connect the slaughter product to a product carrier in a predetermined manner.

31. The device of claim 6, wherein the processing station comprises:

a processing device adapted to perform a processing on the slaughter product and having a working area comprising an inside and an outside, wherein the processing parameter adjustment means is adapted to displace at least part of the processing device in such a manner that the slaughter product is located in at least one of the inside or the outside of the working area of the processing device; and a data-processing system for controlling the processing parameter adjustment means.

32. The device of claim 6, wherein the slaughter product property recording means is adapted to position the slaughter product in a predetermined manner.

33. The device of claim 6, wherein the processing station is a heat treatment station comprising:

an oven with a first outlet and a second outlet, wherein the processing parameter adjustment means is adapted to discharge the slaughter product from at least one of the first outlet or the second outlet; and a data-processing system for controlling the processing parameter adjustment means.

* * * * *